(12) United States Patent
Nakamura

(10) Patent No.: US 8,938,947 B2
(45) Date of Patent: Jan. 27, 2015

(54) CATALYST DEGRADATION DETECTION APPARATUS

(75) Inventor: Takashi Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 248 days.

(21) Appl. No.: 13/583,139

(22) PCT Filed: Feb. 24, 2011

(86) PCT No.: PCT/IB2011/000367
§ 371 (c)(1),
(2), (4) Date: Sep. 6, 2012

(87) PCT Pub. No.: WO2011/110912
PCT Pub. Date: Sep. 15, 2011

(65) Prior Publication Data
US 2012/0324869 A1 Dec. 27, 2012

(30) Foreign Application Priority Data
Mar. 9, 2010 (JP) ................................ 2010-051855

(51) Int. Cl.
*F01N 11/00* (2006.01)
*F02D 41/02* (2006.01)
(Continued)

(52) U.S. Cl.
CPC .......... *F01N 11/007* (2013.01); *F02D 41/0295* (2013.01); *F02D 41/2454* (2013.01);
(Continued)

(58) Field of Classification Search
CPC .............. F01N 11/007; F01N 2550/02; F01N 2550/03; F02D 41/0295; F02D 2200/0814

USPC .................... 60/276, 277, 285, 286
See application file for complete search history.

(56) References Cited

U.S. PATENT DOCUMENTS 4,739,614 A * 4/1988 Katsuno et al. .................. 60/274
4,745,741 A * 5/1988 Masui et al. .................... 60/274
(Continued)

FOREIGN PATENT DOCUMENTS

EP        2 022 968 A1    2/2009
JP        A-05-256175     10/1993
(Continued)

OTHER PUBLICATIONS

International Search Report issued in International Application No. PCT/IB2011/000367 dated Jun. 29, 2011.
(Continued)

*Primary Examiner* — Thomas Denion
*Assistant Examiner* — Mickey France
(74) *Attorney, Agent, or Firm* — Oliff PLC

(57) ABSTRACT

A catalyst degradation detection apparatus includes: calculation means for calculating, as an oxygen storage amount of a catalyst, an amount of oxygen stored into or desorbed from the catalyst during a period from when a change that corresponds to a change in an air/fuel ratio occurs in the signal of a pre-catalyst sensor to when the signal of a post-catalyst sensor reaches a criterion value regarding the change in the air/fuel ratio; catalyst degradation determination means for determining of degradation of the catalyst on the basis of the oxygen storage amount; and correction means for correcting the oxygen storage amount calculated for use for determining of degradation of the catalyst more to a decrease side as a measured responsiveness of the post-catalyst sensor becomes more deteriorated relative to a reference value.

6 Claims, 10 Drawing Sheets

(51) Int. Cl.
*F02D 41/24* (2006.01)
*F02D 41/14* (2006.01)

(52) U.S. Cl.
CPC ......... *F01N2550/02* (2013.01); *F02D 41/1441* (2013.01); *F02D 2200/0808* (2013.01); *F02D 2200/0814* (2013.01); *Y02T 10/47* (2013.01)
USPC .............................................. 60/277; 60/276

(56) References Cited

U.S. PATENT DOCUMENTS

| | | | | |
|---|---|---|---|---|
| 4,817,384 | A * | 4/1989 | Okumura et al. | 60/274 |
| 5,088,281 | A * | 2/1992 | Izutani et al. | 60/274 |
| 5,097,700 | A * | 3/1992 | Nakane | 73/114.75 |
| 5,191,762 | A * | 3/1993 | Kuroda et al. | 60/276 |
| 5,207,057 | A * | 5/1993 | Kayanuma | 60/276 |
| 5,279,116 | A * | 1/1994 | Shimizu et al. | 60/277 |
| 5,282,383 | A * | 2/1994 | Kayanuma | 73/114.75 |
| 5,325,664 | A * | 7/1994 | Seki et al. | 60/276 |
| 5,337,558 | A | 8/1994 | Komatsu | |
| 5,359,853 | A * | 11/1994 | Shimizu | 60/276 |
| 5,444,977 | A * | 8/1995 | Kawabata | 60/276 |
| 5,475,975 | A * | 12/1995 | Nasu | 60/276 |
| 5,533,332 | A * | 7/1996 | Uchikawa | 60/274 |
| 5,727,383 | A * | 3/1998 | Yamashita et al. | 60/276 |
| 5,732,552 | A * | 3/1998 | Matsumoto et al. | 60/276 |
| 5,732,553 | A * | 3/1998 | Mitsutani | 60/276 |
| 5,735,120 | A * | 4/1998 | Nagai | 60/276 |
| 5,737,917 | A * | 4/1998 | Nagai | 60/276 |
| 5,743,082 | A | 4/1998 | Matsumoto et al. | |
| 5,743,086 | A * | 4/1998 | Nagai | 60/276 |
| 5,806,306 | A * | 9/1998 | Okamoto et al. | 60/277 |
| 5,875,628 | A * | 3/1999 | Mitsutani | 60/276 |
| 5,877,413 | A * | 3/1999 | Hamburg et al. | 73/114.75 |
| 6,050,128 | A * | 4/2000 | Hamburg et al. | 73/23.32 |
| 6,116,021 | A * | 9/2000 | Schumacher et al. | 60/274 |
| 6,131,439 | A * | 10/2000 | Hamburg et al. | 73/23.32 |
| 6,301,880 | B1 * | 10/2001 | Cullen et al. | 60/274 |
| 6,324,893 | B1 * | 12/2001 | Watanabe et al. | 73/23.32 |
| 6,338,243 | B1 * | 1/2002 | Takaoka et al. | 60/277 |
| 6,354,077 | B1 * | 3/2002 | Behr et al. | 60/274 |
| 6,383,267 | B1 * | 5/2002 | Takaku et al. | 96/111 |
| 6,976,382 | B2 * | 12/2005 | Kadowaki et al. | 73/1.06 |
| 7,240,479 | B1 * | 7/2007 | Fujimoto | 60/277 |
| 2001/0015066 | A1 * | 8/2001 | Takaku et al. | 60/285 |
| 2001/0025485 | A1 * | 10/2001 | Kobayashi et al. | 60/285 |
| 2001/0028868 | A1 * | 10/2001 | Hashimoto et al. | 422/177 |
| 2002/0011068 | A1 * | 1/2002 | Kako et al. | 60/285 |
| 2002/0029562 | A1 * | 3/2002 | Ishii et al. | 60/277 |
| 2002/0161495 | A1 * | 10/2002 | Yamaki | 701/33 |
| 2002/0173901 | A1 * | 11/2002 | Yoshizawa | 701/109 |
| 2002/0173919 | A1 * | 11/2002 | Moteki et al. | 702/23 |
| 2002/0184877 | A1 * | 12/2002 | Ishii et al. | 60/277 |
| 2003/0005746 | A1 * | 1/2003 | Iwazaki et al. | 73/1.06 |
| 2003/0019485 | A1 | 1/2003 | Kobayashi et al. | |
| 2003/0041590 | A1 * | 3/2003 | Kitajima et al. | 60/277 |
| 2003/0041591 | A1 * | 3/2003 | Kuroda et al. | 60/277 |
| 2003/0041592 | A1 * | 3/2003 | Nishioka et al. | 60/277 |
| 2003/0097873 | A1 * | 5/2003 | Surnilla | 73/118.1 |
| 2003/0098008 | A1 * | 5/2003 | Surnilla | 123/277 |
| 2003/0140680 | A1 * | 7/2003 | Nagashima et al. | 73/23.32 |
| 2003/0159432 | A1 * | 8/2003 | Kobayashi et al. | 60/274 |
| 2004/0025856 | A1 * | 2/2004 | Iida et al. | 123/688 |
| 2004/0040541 | A1 * | 3/2004 | Goto et al. | 123/445 |
| 2004/0134186 | A1 * | 7/2004 | Wang et al. | 60/289 |
| 2004/0139736 | A1 * | 7/2004 | Yoshizawa et al. | 60/285 |
| 2004/0211168 | A1 * | 10/2004 | Namiki | 60/276 |
| 2004/0226282 | A1 * | 11/2004 | Hattori | 60/285 |
| 2005/0262828 | A1 * | 12/2005 | Iihoshi et al. | 60/277 |
| 2007/0051094 | A1 * | 3/2007 | Tanada | 60/277 |
| 2007/0113538 | A1 * | 5/2007 | Kato | 60/276 |
| 2007/0220862 | A1 * | 9/2007 | Suehiro et al. | 60/277 |
| 2007/0220863 | A1 | 9/2007 | Iida et al. | |
| 2007/0227121 | A1 * | 10/2007 | Iida et al. | 60/276 |
| 2007/0227123 | A1 * | 10/2007 | Iida et al. | 60/277 |
| 2007/0240403 | A1 * | 10/2007 | Miyasako et al. | 60/277 |
| 2007/0256406 | A1 | 11/2007 | Makki et al. | |
| 2007/0298504 | A1 * | 12/2007 | Mueller et al. | 436/37 |
| 2008/0028828 | A1 * | 2/2008 | Iihoshi et al. | 73/23.2 |
| 2008/0028829 | A1 * | 2/2008 | Sawada et al. | 73/23.32 |
| 2008/0148711 | A1 * | 6/2008 | Takubo | 60/285 |
| 2008/0184695 | A1 * | 8/2008 | Anilovich et al. | 60/274 |
| 2008/0295488 | A1 * | 12/2008 | Takubo | 60/276 |
| 2008/0302087 | A1 * | 12/2008 | Genslak et al. | 60/277 |
| 2009/0019834 | A1 * | 1/2009 | Aoki | 60/277 |
| 2009/0145110 | A1 * | 6/2009 | Fukuchi et al. | 60/277 |
| 2009/0150019 | A1 * | 6/2009 | Sakamoto et al. | 701/29 |
| 2009/0248281 | A1 * | 10/2009 | Iihoshi et al. | 701/109 |
| 2009/0266054 | A1 * | 10/2009 | Iihoshi et al. | 60/277 |
| 2009/0288391 | A1 * | 11/2009 | Aoki | 60/273 |
| 2009/0313974 | A1 * | 12/2009 | Iida | 60/287 |
| 2010/0050602 | A1 * | 3/2010 | Fujimoto | 60/277 |
| 2010/0242933 | A1 * | 9/2010 | Anilovich et al. | 123/672 |
| 2010/0307135 | A1 * | 12/2010 | Miyamoto et al. | 60/277 |
| 2011/0120095 | A1 * | 5/2011 | Wald et al. | 60/276 |

FOREIGN PATENT DOCUMENTS

| | | | |
|---|---|---|---|
| JP | A-08-100635 | 4/1996 | |
| JP | 08220051 A * | 8/1996 | G01N 27/26 |
| JP | A-2001-227384 | 8/2001 | |
| JP | A-2002-130018 | 5/2002 | |
| JP | A-2007-255336 | 10/2007 | |
| JP | A-2008-031901 | 2/2008 | |
| JP | 2008261254 A * | 10/2008 | |
| JP | A-2009-203940 | 9/2009 | |
| WO | WO 2009106973 A1 * | 9/2009 | F01N 11/00 |

OTHER PUBLICATIONS

Written Opinion of the International Searching Authority issued in International Patent Application No. PCT/IB2011/000367 dated Jun. 29, 2011.

* cited by examiner

FIG.8

| | $B < T$ | $B \geq T$ |
|---|---|---|
| $A < S$ | WITH DEGRADATION | WITH DEGRADATION |
| $A \geq S$ | SUSPENDED | WITHOUT DEGRADATION |

FIG. 9A

|  | B<T | B≥T |
|---|---|---|
| A<S | WITH DEGRADATION | WITHOUT DEGRADATION |
| A≥S | SUSPENDED | WITHOUT DEGRADATION |

FIG. 9B

|  | B<T | B≥T |
|---|---|---|
| A<S | WITH DEGRADATION | SUSPENDED |
| A≥S | SUSPENDED | WITHOUT DEGRADATION |

FIG. 9C

|  | B<T | B≥T |
|---|---|---|
| A<S | WITH DEGRADATION | WITHOUT DEGRADATION |
| A≥S | WITHOUT DEGRADATION | WITHOUT DEGRADATION |

FIG. 9D

|  | B<T | B≥T |
|---|---|---|
| A<S | WITH DEGRADATION | WITH DEGRADATION |
| A≥S | WITH DEGRADATION | WITHOUT DEGRADATION |

FIG. 9E

|  | B<T | B≥T |
|---|---|---|
| A<S | WITH DEGRADATION | SUSPENDED |
| A≥S | WITHOUT DEGRADATION | WITHOUT DEGRADATION |

FIG. 9F

|  | B<T | B≥T |
|---|---|---|
| A<S | WITH DEGRADATION | SUSPENDED |
| A≥S | WITH DEGRADATION | WITHOUT DEGRADATION |

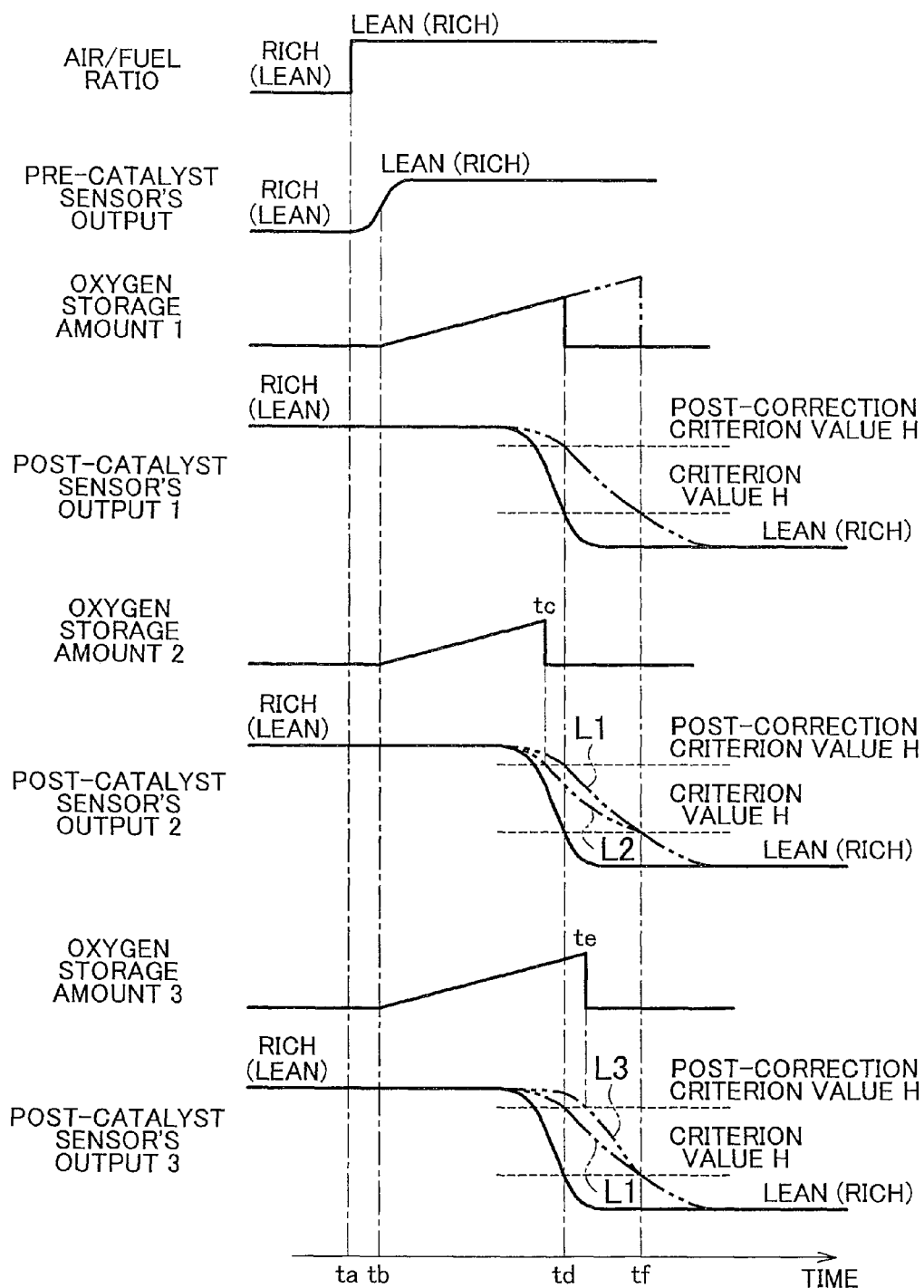

CATALYST DEGRADATION DETECTION APPARATUS

BACKGROUND OF THE INVENTION

1. Field of the Invention

The invention relates to a catalyst degradation detection apparatus.

2. Description of the Related Art

In internal combustion engines mounted in vehicles, such as motor vehicles and the like, an exhaust passageway is provided with a catalyst for exhaust emission control, whereby NOx, HCs and CO in exhaust gas that flows in the exhaust passageway are removed. Besides, in order to remove these three components of exhaust gas, the catalyst is equipped with an oxygen storage function, and stoichiometric air/fuel ratio control of controlling the air/fuel ratio of the air-fuel mixture in a combustion chamber of the internal combustion engine to the stoichiometric air/fuel ratio is performed.

The oxygen storage function of the catalyst herein means a function of storing oxygen from exhaust gas into the catalyst according to the oxygen concentration in exhaust gas that passes through the catalyst, and of desorbing oxygen stored in the catalyst and releasing it from the catalyst into exhaust gas. Specifically, during a state in which the oxygen concentration in exhaust gas is higher than a value of oxygen concentration obtained when a mixture whose air/fuel ratio is set at the stoichiometric air/fuel ratio is burned in the combustion chamber, that is, during a state in which a mixture whose air/fuel ratio is leaner than the stoichiometric air/fuel ratio is burned in the combustion chamber, oxygen in the exhaust gas that passes through the catalyst is stored into the catalyst due to the foregoing oxygen storage function of the catalyst. On the other hand, during a state in which the oxygen concentration in exhaust gas is lower than the value of oxygen concentration obtained when the mixture whose air/fuel ratio is set at the stoichiometric air/fuel ratio is burned in the combustion chamber, that is, during a state in which a mixture whose air/fuel ratio is richer than the stoichiometric air/fuel ratio is burned in the combustion chamber, oxygen stored in the catalyst is desorbed and released from the catalyst into the exhaust gas due to the oxygen storage function of the catalyst.

Besides, in the foregoing stoichiometric air/fuel ratio control, the amount of fuel injection of the internal combustion engine is adjusted according to the oxygen concentration in exhaust gas so that the oxygen concentration in exhaust gas becomes equal to the value of oxygen concentration obtained when the mixture whose air/fuel ratio is set at the stoichiometric air/fuel ratio is burned in the combustion chamber. This stoichiometric air/fuel ratio control uses a pre-catalyst sensor that is provided in the exhaust passageway upstream of the catalyst and that outputs a signal based on the oxygen concentration in exhaust gas, and a post-catalyst sensor that is provided in the exhaust passageway downstream of the catalyst and that outputs a signal based on the oxygen concentration.

Specifically, the amount of fuel injection of the internal combustion engine is adjusted according to the signal from the pre-catalyst sensor so that the oxygen concentration in exhaust gas upstream of the catalyst becomes equal to the value of oxygen concentration obtained when the mixture whose air/fuel ratio is set at the stoichiometric air/fuel ratio is burned in the combustion chamber. Due to this adjustment, the air/fuel ratio of the mixture in the combustion chamber of the internal combustion engine is controlled so as to converge to the stoichiometric air/fuel ratio while fluctuating between the fuel-rich side and the fuel-lean side of the stoichiometric air/fuel ratio. However, in the case where only the adjustment of the fuel injection amount commensurate with the output signal of the pre-catalyst sensor is performed, there is still a possibility that the center of fluctuation of the air/fuel ratio of the internal combustion engine that fluctuates between the rich and lean sides so as to converge to the stoichiometric air/fuel ratio as described above will deviate from the stoichiometric air/fuel ratio, due to product variations of the pre-catalyst sensor, or the like. In order to correct such a deviation, the fuel injection amount of the internal combustion engine is adjusted also according to the signal output by the post-catalyst sensor so that the center of fluctuation of the air/fuel ratio of the internal combustion engine that fluctuates between the rich side and the lean side due to the adjustment of the fuel injection amount commensurate with the signal from the pre-catalyst sensor becomes equal to the stoichiometric air/fuel ratio.

Thus, by equipping the catalyst with the oxygen storage function and performing the stoichiometric air/fuel ratio control, it becomes possible to effectively remove the three components in exhaust gas, that is, NOx, HCs and CO. Specifically, when, during execution of the stoichiometric air/fuel ratio control, the air/fuel ratio of the mixture in the combustion chamber changes to the lean side, the oxygen concentration in exhaust gas that passes through the catalyst becomes higher than the value of oxygen concentration obtained when the mixture whose air/fuel ratio is set at the stoichiometric air/fuel ratio is burned in the combustion chamber, so that oxygen in the exhaust gas that passes through the catalyst is stored into the catalyst and therefore NOx in the exhaust gas is reduced. On the other hand, when, during execution of the stoichiometric air/fuel ratio control, the air/fuel ratio of the mixture in the combustion chamber changes to the rich side, the oxygen concentration in exhaust gas that passes through the catalyst becomes lower than the value of oxygen concentration obtained when the mixture whose air/fuel ratio is set at the stoichiometric air/fuel ratio is burned in the combustion chamber, so that oxygen stored in the catalyst desorbs from the catalyst, and oxidizes HCs and CO in the exhaust gas. Therefore, during execution of the stoichiometric air/fuel ratio control, when the air/fuel ratio of the mixture in the combustion chamber fluctuates between the rich and lean sides as the air/fuel ratio converges to the stoichiometric air/fuel ratio, the three components of exhaust gas, that is, NOx, HCs and CO, are effectively removed.

Incidentally, as for the catalyst, the oxygen storage function declines as the catalyst degrades. Therefore, it has been proposed to find a maximum value of the amount of oxygen stored in the catalyst (hereinafter, termed the oxygen storage amount), and to determine, on the basis of the oxygen storage amount, whether or not degradation of the degrade catalyst is present. For example, in Japanese Patent Application Publication No. 2008-31901 (JP-A-2008-31901), the presence or absence of degradation of the catalyst is determined by the following procedure.

When the air/fuel ratio of the mixture burned in the combustion chamber of an internal combustion engine is forced to change between the rich and lean sides as shown in a time chart of the air/fuel ratio in FIG. 10 (at a timing ta), a change occurs in the signal of a pre-catalyst sensor correspondingly as shown in a time chart of the pre-catalyst sensor's output in FIG. 10. Incidentally, a timing tb in the time chart of the pre-catalyst sensor's output in FIG. 10 is a timing at which the signal of the pre-catalyst sensor comes to have a value that corresponds to the oxygen concentration in exhaust gas that results when the mixture at the stoichiometric air/fuel ratio is burned. Then, the amount of oxygen stored into the catalyst or desorbed from the catalyst during a period (tb to td) from when the foregoing change occurs in the signal of the pre-catalyst sensor till when a change that corresponds to the change in the air/fuel ratio occurs in the signal of the post-catalyst sensor is calculated. Incidentally, the determination that a change that corresponds to the change in the air/fuel ratio has occurred in the signal of the post-catalyst sensor can be made on condition that the signal has reached a criterion value H set for making the determination as shown by a solid line in the time chart of the post-catalyst sensor's output 1 in FIG. 10.

For example, if the forced change in the air/fuel ratio occurs from the rich side to the lean side, oxygen is stored into the catalyst during the period (tb to td). Then, the amount of oxygen stored into the catalyst during the period is calculated, and the calculated amount of oxygen is determined as the oxygen storage amount of the catalyst. Incidentally, the oxygen storage amount thus found changes during the period (tb to td) as shown by a solid line in a time chart of the oxygen storage amount 1 in FIG. 10. On the other hand, if the forced change in the air/fuel ratio occurs from the lean side to the rich side, oxygen is desorbed from the catalyst during the period (tb to td). Then, the amount of oxygen desorbed from the catalyst during the period is calculated, and the calculated amount of oxygen is determined as the oxygen storage amount of the catalyst. Incidentally, the oxygen storage amount thus found also changes during the period (tb to td) as shown by the solid line in the time chart of the oxygen storage amount 1 in FIG. 10.

Then, in order to determine the presence or absence of degradation of the catalyst, the oxygen storage amount found at the time point of the end of the period (tb to td) with a threshold value set for the determination regarding the degradation. Concretely, if the oxygen storage amount is less than the threshold value, it can be determined that decline of the oxygen storage function due to degradation of the catalyst has occurred, and therefore it is determined that degradation of the catalyst is present. On the other hand, if the oxygen storage amount is greater than or equal to the threshold value, it can be determined that decline of the oxygen storage function due to degradation of the catalyst has not occurred, and therefore it is determined that degradation of the catalyst is not present (the catalyst is normal).

However, in the foregoing determination as to the presence or absence of degradation of the catalyst, it sometimes happens that the oxygen storage amount found for use for the determination deviates from a proper value to the increase side due to the effect of deterioration of the responsiveness of the signal from the post-catalyst sensor to a change in the oxygen concentration in exhaust gas downstream of the catalyst. For example, if the deterioration of the responsiveness of the post-catalyst sensor appears in the signal of the same sensor in the form of a change from the transition shown by the solid line in the time chart of the post-catalyst sensor's output 1 in FIG. 10 to the transition shown by a two-dot chain line in the same time chart, the period for which the oxygen storage amount is calculated increases from the period from tb to td to a period from tb to tf. In consequence, the oxygen storage amount found at the end time point of the period (tb to tf) is a value (value at the timing tf) that is excessively larger than a proper value (value at the timing td), as shown by the two-dot chain line in the time chart of the oxygen storage amount 1 in FIG. 10. Then, if the presence or absence of degradation of the catalyst is determined on the basis of the oxygen storage amount whose value is deviated from the proper value to the increase side, an error may sometimes occur in the determination.

As a countermeasure against the foregoing problem, JP-A-2008-31901 discloses that a travel distance of the vehicle or an accumulated operation time of the internal combustion engine is measured as a parameter which correlates with the responsiveness of the post-catalyst sensor, and that the criterion value H is corrected on the basis of the measured parameter (which corresponds to the responsiveness of the post-catalyst sensor). Specifically, the criterion value H is corrected so as to make the determination more gentle (so as to be positioned higher in the time chart of the post-catalyst sensor's output 1 in FIG. 10) the more the parameter comes to deteriorate the responsiveness of the post-catalyst sensor. In this case, the criterion value H is corrected on the basis of the parameter (the responsiveness of the post-catalyst sensor) so that the two-dot chain line L1 in this time chart reaches the post-correction criterion value H at the timing td. In this manner, the oxygen storage amount that is found is restrained from deviating from a proper value to the increase side due to deterioration of the responsiveness of the post-catalyst sensor.

As described above, by correcting the criterion value H on the basis of the parameter that correlates with the responsiveness of the post-catalyst sensor, the restraint of deviation of the oxygen storage amount from a proper value due to deterioration of the responsiveness of the post-catalyst sensor can be pursued.

However, the effect of deterioration of the responsiveness of the post-catalyst sensor does not necessarily appear in the signal from the post-catalyst sensor in a manner as shown by the two-dot chain line in the time chart of the post-catalyst sensor output 1 in FIG. 10, and may possibly appear in the signal from the post-catalyst sensor in a manner that is different from the manner shown by the two-dot chain line, depending on the state of operation of the internal combustion engine, or the like. For example, even when the degree of deterioration of the responsiveness of the post-catalyst sensor is substantially equal to the degree of deterioration shown by the two-dot chain line in the time chart of the post-catalyst sensor output 1 in FIG. 10, the effect of deterioration of the responsiveness of the post-catalyst sensor may possibly appear in the signal of the post-catalyst sensor, for example, in a manner as shown by a two-dot chain line L2 in a time chart of the post-catalyst sensor's output 2 in FIG. 10 or a two-dot chain line L3 in a time chart of the post-catalyst sensor's output 3 in FIG. 10, depending on the state of operation of the internal combustion engine, or the like. Incidentally, the two-dot chain line L1 in each of the time chart of the post-catalyst sensor's output 2 and the time chart of the post-catalyst sensor's output 3 is the same as a two-dot chain line in the time chart of the post-catalyst sensor's output 1 in FIG. 10.

As can be seen from the time chart of the post-catalyst sensor's output 2 in FIG. 10, the two-dot chain line L2 is positioned below the two-dot chain line L1 before the timing tf, and coincides with the two-dot chain line L2 after the timing tf. In this case, the two-dot chain line L2 reaches the post-correction criterion value H at a timing tc prior to the timing td. Therefore, at the timing tc, the oxygen storage amount in the period from tb to tc is found. Incidentally, during this period, the oxygen storage amount changes as shown in a time chart of the oxygen storage amount 2 in FIG. 10. The oxygen storage amount found at the timing tc is a value deviated from a proper value (a value on the solid line at the timing td in the time chart of the oxygen storage amount 1 in FIG. 10) to the decrease side. Therefore, if the presence or absence of degradation of the catalyst is determined on the basis of the oxygen storage amount that is found at the timing tc, an error may sometimes occur in the determination.

On another hand, as can be seen from the time chart of the post-catalyst sensor's output 3, the two-dot chain line L3 is positioned above the two-dot chain line L1 before the timing tf, and coincides with the two-dot chain line L1 after the timing tf. In this case, the two-dot chain line L3 reaches the post-correction criterion value H at a timing te after the timing td. Therefore, at the timing te, the oxygen storage amount during the period from tb to te is found. Incidentally, during this period, the oxygen storage amount changes as shown in the time chart of the post-catalyst sensor's output 3 in FIG. 10. The oxygen storage amount found at the timing te is a value deviated from a proper value (the value on the solid line at the timing td in the time chart of the oxygen storage amount 1 in FIG. 10) to the increase side. Therefore, if the presence or absence of degradation of the catalyst is determined on the basis of the oxygen storage amount that is found at the timing te, an error may sometimes occur in the determination.

As described above, if the effect of deterioration of the responsiveness of the post-catalyst sensor which appears in the signal from the post-catalyst sensor varies as shown by the two-dot chain line L2 in the time chart of the post-catalyst sensor's output 2 in FIG. 10 and the two-dot chain line. L3 in the time chart of the post-catalyst sensor's output 3 in FIG. 10 with reference to the two-dot chain line L1 in the time charts of the post-catalyst sensor's output 2 and the post-catalyst sensor's output 3 in FIG. 10, the oxygen storage amount for use for the determination as to the presence or absence of degradation of the catalyst is deviated from the proper value as described above. Since there is possibility that the presence or absence of degradation of the catalyst may be determined on the basis of the oxygen storage amount deviated from the proper value, it cannot be clearly said that a result of the determination is definitely proper.

SUMMARY OF THE INVENTION

The invention provides a catalyst degradation detection apparatus capable of properly determining the presence or absence of degradation of catalyst irrespective of variations in the effect of deterioration of the responsiveness of a post-catalyst sensor which appears in the signal from the post-catalyst sensor.

A catalyst degradation detection apparatus in accordance with an aspect of the invention includes: a pre-catalyst sensor that is provided in an exhaust passageway of an internal combustion engine upstream of a catalyst and that outputs a signal based on an oxygen concentration in exhaust gas; a post-catalyst sensor that is provided in the exhaust passageway downstream of the catalyst and that outputs a signal based on the oxygen concentration in the exhaust gas; air/fuel ratio control means for forcing air/fuel ratio of the internal combustion engine to change between a rich side and a lean side; calculation means for providing a criterion value for determining that a change that corresponds to a change in the air/fuel ratio has occurred in the signal of the post-catalyst sensor, and for calculating as an oxygen storage amount of the catalyst an amount of oxygen stored into the catalyst or desorbed from the catalyst during a period from when the change that corresponds to the change in the air/fuel ratio occurs in the signal of the pre-catalyst sensor to when the signal of the post-catalyst sensor reaches the criterion value; catalyst degradation determination means for determining presence or absence of degradation of the catalyst based on the oxygen storage amount; responsiveness measurement means for measuring responsiveness of a change in the signal output by the post-catalyst sensor to a change in the oxygen concentration in the exhaust gas downstream of the catalyst; and correction means for correcting the oxygen storage amount calculated for use for determining the presence or absence of degradation of the catalyst more to a decrease side as the responsiveness of the post-catalyst sensor measured by the responsiveness measurement means becomes more deteriorated relative to a reference value.

In the catalyst degradation detection apparatus in accordance with the foregoing aspect of the invention, a value of the responsiveness obtained when the responsiveness of the post-catalyst sensor is not deteriorated may be set as the reference value.

According to the catalyst degradation detection apparatus in accordance with the foregoing aspect, the presence or absence of degradation of the catalyst provided in the exhaust passageway of the internal combustion engine is determined by using the pre-catalyst sensor that is provided in the exhaust passageway upstream of the catalyst and that outputs the signal based on the oxygen concentration in exhaust gas, and the post-catalyst sensor that is provided in the exhaust passageway downstream of the catalyst and that outputs the signal based on the oxygen concentration in exhaust gas. Specifically, the air/fuel ratio of the internal combustion engine is forced to change between the lean side and the rich side by the air/fuel ratio control means, and the amount of oxygen stored into the catalyst or desorbed from the catalyst during the period from when the change that corresponds to the change in the air/fuel ratio occurs in the signal of the pre-catalyst sensor to when the change that corresponds to the change in the air/fuel ratio occurs in the signal of the post-catalyst sensor. Incidentally, it is determined that the change that corresponds to the change in the air/fuel ratio has occurred in the signal of the post-catalyst sensor, on condition that the signal reaches the criterion value for this determination. Then, when the amount of oxygen stored into the catalyst or desorbed from the catalyst during the foregoing period is calculated, the calculated value is set as the oxygen storage amount of the catalyst. The oxygen storage amount found in this manner is affected by the responsiveness of the change in the signal of the post-catalyst sensor to the change in the oxygen concentration in exhaust gas downstream of the catalyst. Therefore, the responsiveness of the post-catalyst sensor is measured. Then, the more deteriorated the measured responsiveness relative to the reference value, the more greatly to the decrease side the oxygen storage amount found for use for determining the presence or absence of degradation of the catalyst is corrected by the correction means. On the basis of the oxygen storage amount corrected in this manner, the presence or absence of degradation of the catalyst is determined by the catalyst degradation determination means.

In the related art, instead of directly correcting the oxygen storage amount set for determining the presence or absence of degradation of the catalyst on the basis of the foregoing responsiveness of the post-catalyst sensor, the responsiveness is reflected in the oxygen storage amount by the following technique. Specifically, the responsiveness of the post-catalyst sensor is reflected in the oxygen storage amount by correcting the criterion value for determining that the change that corresponds to the change in the air/fuel ratio has occurred in the signal output by the post-catalyst sensor, on the basis of the responsiveness of the post-catalyst sensor. In this case, when the effect of deterioration of the responsiveness of the post-catalyst sensor which appears in the signal from the post-catalyst sensor varies depending on the state of operation of the internal combustion engine, or the like, it sometimes happens that the oxygen storage amount in which the responsiveness of the post-catalyst sensor has been reflected has a value that is deviated from a proper value. Since there is possibility that the presence or absence of degradation of the catalyst may be determined on the basis of the oxygen storage amount whose value is deviated from the proper value, it cannot be clearly said that a result of the determination is definitely proper.

In this respect, however, the catalyst degradation detection apparatus in accordance with the foregoing aspect directly corrects the oxygen storage amount set for determining the presence or absence of degradation of the catalyst on the basis of the responsiveness of the post-catalyst sensor. Therefore, even if the effect of deterioration of the responsiveness of the post-catalyst sensor which appears in the signal from the post-catalyst sensor varies depending on the state of operation of the internal combustion engine, or the like, the variation can be prevented from resulting in variation of the post-correction oxygen storage amount. Therefore, even if the effect of deterioration of the responsiveness of the post-catalyst sensor which appears in the signal from the post-catalyst sensor varies as described above, the post-correction oxygen storage amount is restrained from deviating from the proper value. Therefore, by determining the presence or absence of degradation of the catalyst on the basis of the post-correction oxygen storage amount, it is possible to properly determine the presence or absence of degradation of the catalyst irrespective of variations in the effect of deterioration of the responsiveness of the post-catalyst sensor which appears in the signal of the post-catalyst sensor.

In the catalyst degradation detection apparatus in accordance with the foregoing aspect: the responsiveness measurement means may measure the responsiveness of the signal output by the post-catalyst sensor to the change in the air/fuel ratio to the lean side when the air/fuel ratio of the internal combustion engine is changed from the rich side to the lean side by the air/fuel ratio control means or a fuel-cut control, and the responsiveness of the signal output by the post-catalyst sensor to the change in the air/fuel ratio to the rich side when the air/fuel ratio of the internal combustion engine is changed from the lean side to the rich side by the air/fuel ratio control means; the calculation means may calculate the amount of oxygen that is stored into the catalyst when the air/fuel ratio of the internal combustion engine is forced to change from the rich side to the lean side by the air/fuel ratio control means, as the oxygen storage amount found when oxygen is stored, and may calculate the amount of oxygen that is desorbed from the catalyst when the air/fuel ratio of the internal combustion engine is forced to change from the lean side to the rich side by the air/fuel ratio control means, as the oxygen storage amount found when oxygen is desorbed; the correction means may correct the oxygen storage amount found when oxygen is stored, based on the responsiveness of the post-catalyst sensor to the change in the air/fuel ratio to the lean side, and may correct the oxygen storage amount found when oxygen is desorbed, based on the responsiveness of the post-catalyst sensor to the change in the air/fuel ratio to the rich side; and when only one of the responsiveness of the post-catalyst sensor to the change in the air/fuel ratio to the lean side and the responsiveness of the post-catalyst sensor to the change in the air/fuel ratio to the rich side has been measured, the catalyst degradation determination means may calculate an average value of the oxygen storage amount corrected based on the one of the responsivenesses that has been measured and the oxygen storage amount that corresponds to the responsiveness that has not been measured, and may determine the presence or absence of degradation of the catalyst based on comparison of the corrected oxygen storage amount with a predetermined first threshold value and comparison of the average value with a second threshold value that is greater than the first threshold value.

According to the catalyst degradation detection apparatus in accordance with this construction, the responsiveness of the signal output by the post-catalyst sensor to the change in the air/fuel ratio of the internal combustion engine to the lean side when the air/fuel ratio is changed from the rich side to the lean side is measured, and the responsiveness of the signal output by the post-catalyst sensor to the change in the air/fuel ratio of the internal combustion engine to the rich side when the air/fuel ratio is changed from the lean side to the rich side is measured. Besides, the amount of oxygen that is stored into the catalyst when the air/fuel ratio of the internal combustion engine is forced to change from the rich side to the lean side is calculated as the oxygen storage amount found when oxygen is stored, and the amount of oxygen that is desorbed from the catalyst when the air/fuel ratio of the internal combustion engine is forced to change from the lean side to the rich side is calculated as the oxygen storage amount found when oxygen is desorbed. Then, the oxygen storage amount found when oxygen is stored is corrected on the basis of the responsiveness of the post-catalyst sensor to the change in the air/fuel ratio to the lean side, and the oxygen storage amount found when oxygen is desorbed is corrected on the basis of the responsiveness of the post-catalyst sensor to the change in the air/fuel ratio to the rich side.

In order to accurately determine the presence or absence of degradation of the catalyst, it is preferable to determine the presence or absence of degradation of the catalyst on the basis of a post-correction value of the oxygen storage amount found when oxygen is stored and a post-correction value of the oxygen storage amount found when oxygen is desorbed. However, if this manner of determining the presence or absence of degradation of the catalyst is to be realized, it is inevitable that a long time is required before the determination is completed. This is because if both the responsiveness of the post-catalyst sensor to the change to the lean side which is for use for correction of the oxygen storage amount found when oxygen is stored and the responsiveness of the post-catalyst sensor to the change to the rich side which is for use for correction of the oxygen storage amount found when oxygen is desorbed are to be measured, the completion of measurement of both the responsivenesses requires a long time. Specifically, as for the measurement of the responsiveness of the post-catalyst sensor to the change to the lean side and the measurement of the responsiveness thereof to the change to the rich side, it is highly likely that the frequency of the measurement of one of the two responsivenesses is different from the frequency of the measurement of the other responsiveness. Therefore, there occurs a situation in which one of the responsiveness of the post-catalyst sensor to the change to the lean side and the responsiveness thereof to the change to the rich side can be measured but the other cannot be measured. Hence, the completion of the responsiveness measurement requires a long time.

In this respect, the catalyst degradation detection apparatus in accordance with the foregoing construction determines the presence or absence of degradation of the catalyst in the manner described below so as to promptly complete the determination as to the presence or absence of degradation of the catalyst while avoiding decline in the accuracy of the determination. That is, when only one of the responsiveness of the post-catalyst sensor to the change in the air/fuel ratio to the lean side and the responsiveness of the post-catalyst sensor to the change in the air/fuel ratio to the rich side has been measured, an average value of the oxygen storage amount corrected based on the one of the responsivenesses that has been measured and the oxygen storage amount that corresponds to the responsiveness that has not been measured is calculated. Then, the presence or absence of degradation of the catalyst is determined on the basis of comparison of the corrected oxygen storage amount with the first threshold value and comparison of the average value with the second threshold value.

In this case, the presence or absence of degradation of the catalyst can be determined provided that only one of the responsiveness of the post-catalyst sensor to the change to the lean side and the responsiveness thereof to the change to the rich side. Therefore, the determination can be promptly completed. The determination as to the presence or absence of degradation of the catalyst is not only performed on the basis of the oxygen storage amount corrected on the basis of the responsiveness of the post-catalyst sensor, but also is performed on the basis of the average value of the oxygen storage amount that corresponds to the responsiveness of the post-catalyst sensor that has not been measured and the post-correction oxygen storage amount. In the case where the determination as to the presence or absence of degradation of the catalyst is performed by taking into account not only the post-correction oxygen storage amount but also the foregoing average value, it is possible to restrain the decline in the accuracy of the determination which would be caused by determining the presence or absence of degradation of the catalyst on the basis of only the post-correction oxygen storage amount.

In the catalyst degradation detection apparatus in accordance with the foregoing construction, the catalyst degradation determination means may determine that the catalyst has degraded, if the corrected oxygen storage amount is less than the first threshold value.

According to the catalyst degradation detection apparatus in accordance with this construction, if after one of the responsiveness of the post-catalyst sensor to the change to the lean side and the responsiveness thereof to the change to the rich side is measured, the oxygen storage amount corrected on the basis of the measured responsiveness is less than the first threshold value, it is immediately determined that degradation of the catalyst is present. It is to be noted herein that the situation in which the oxygen storage amount corrected on the basis of the responsiveness of the post-catalyst sensor is less than the first threshold value means a situation in which it is doubtful that the catalyst is normal. When the normality of the catalyst is doubtful in this manner, it is determined that degradation of the catalyst is present, as described above. Therefore, in situations in which it is doubtful that the catalyst is normal, the invention reduces the incidence of a situation in which although the catalyst has actually degraded, it is not determined that degradation of the catalyst is present.

Besides, in the catalyst degradation detection apparatus in accordance with the foregoing construction, the catalyst degradation determination means may determine that the catalyst has not degraded, if the corrected oxygen storage amount is greater than or equal to the first threshold value and the average value is greater than or equal to the second threshold value.

According to the catalyst degradation detection apparatus in accordance with this construction, if after one of the responsiveness of the post-catalyst sensor to the change to the lean side and the responsiveness there of to the change to the rich side is measured, the oxygen storage amount corrected on the basis of the responsiveness to the change to the lean side is greater than or equal to a first threshold value and the average value is greater than or equal to the second threshold value, it is determined that that the catalyst has not degraded. It is to be noted herein that the situation in which the oxygen storage amount corrected on the basis of the responsiveness of the post-catalyst sensor is greater than or equal to the first threshold value and the average value is greater than or equal to the second threshold value means a situation in which it is very highly likely that the catalyst is normal. When it is very highly likely that the catalyst is normal, it is determined that the catalyst has not degraded as described above. Therefore, the determination can be made accurate when it is determined that the catalyst has not degraded.

Besides, in the catalyst degradation detection apparatus in accordance with the foregoing construction, the catalyst degradation determination means may suspend determination as to the presence or absence of degradation of the catalyst, if the corrected oxygen storage amount is greater than or equal to the first threshold value and the average value is less than the second threshold value.

According to the catalyst degradation detection apparatus in accordance with this construction, after one of the responsiveness of the post-catalyst sensor to the change to the lean side and the responsiveness thereof to the change to the rich side is measured, the determination as to the presence or absence of degradation of the catalyst is suspended provided that the oxygen storage amount corrected on the basis of the measured responsiveness is greater than or equal to the first threshold value and the average value is less than the second threshold value. It is to be noted herein that the situation in which the oxygen storage amount corrected on the basis of the responsiveness of the post-catalyst sensor is greater than or equal to the first threshold value and the average value is less than the second threshold value means a situation in which it is difficult to determine whether the catalyst has degraded, or has not degraded but is normal. When it is difficult to determine whether the catalyst has degraded, or has not degraded but is normal, the determination as to the presence or absence of degradation of the catalyst is suspended as stated above. Therefore, it is possible to avoid an error in the determination as to the presence or absence of degradation of the catalyst which can be caused in the case where the determination is performed easily without careful consideration.

Besides, in the catalyst degradation detection apparatus in accordance with the foregoing aspect, when both the responsiveness of the post-catalyst sensor to the change in the air/fuel ratio to the lean side and the responsiveness of the post-catalyst sensor to the change in the air/fuel ratio to the rich side have been measured, the catalyst degradation determination means may compare the oxygen storage amount corrected based on the responsiveness to the change to the lean side with a predetermined third threshold value and may compare the oxygen storage amount corrected based on the responsiveness to the change to the rich side with the predetermined third threshold value, and may determine that the catalyst has degraded, if at least one of the corrected oxygen storage amounts is less than the third threshold value, and may determine that the catalyst has not degraded, if both the corrected oxygen storage amounts are greater than or equal to the third threshold value.

BRIEF DESCRIPTION OF THE DRAWINGS

The features, advantages, and technical and industrial significance of this invention will be described below with reference to the accompanying drawings, in which like numerals denote like elements, and wherein:

FIG. 8 is a table summarizing the results of determination obtained when the presence or absence of degradation of the three-way catalyst is determined by the quick determination process in accordance with the embodiment;

FIG. 9A to FIG. 9F are tables showing other examples of the results of the determination of the presence or absence of degradation of the three-way catalyst by the quick determination process in accordance with the embodiment; and FIG. 10 is a time chart showing changes in the air/fuel ratio of an engine, changes in the output signal of a pre-catalyst sensor, changes in the oxygen storage amount found, and changes in the output signal of a post-catalyst sensor in an active air/fuel ratio control in accordance with the related art.

DETAILED DESCRIPTION OF EMBODIMENTS

Figure 1:
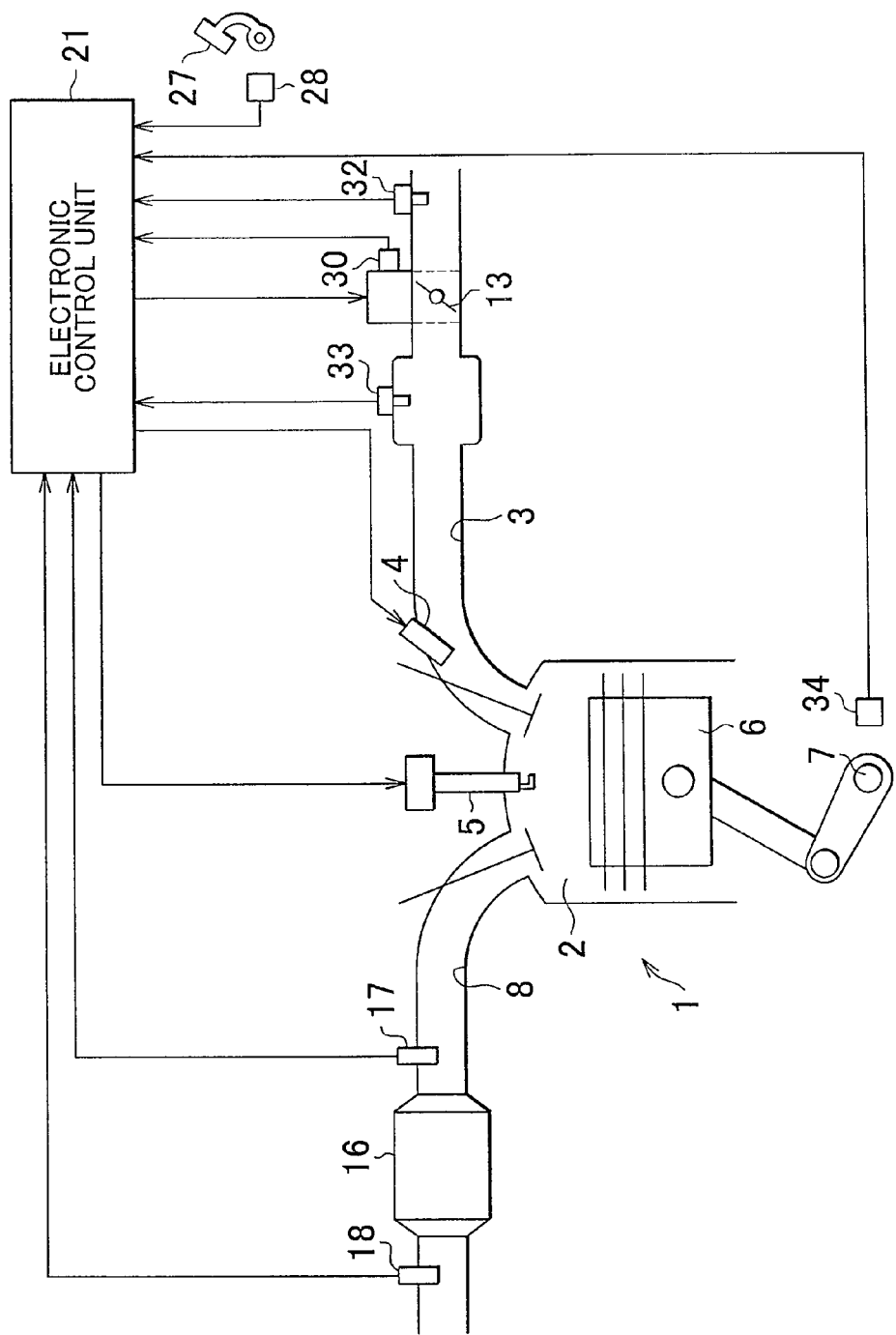
FIG. 1 is a schematic diagram showing an overall construction of an engine to which a catalyst degradation detection apparatus in accordance with an embodiment of the invention is applied.

An embodiment in which the invention is applied to a motor vehicle engine will be described hereinafter with reference to FIG. 1 to FIG. 8. In an engine 1, a throttle valve 13 is provided in an intake passageway 3 leading to a combustion chamber 2 so that the throttle valve 13 can be opened and closed. Air is taken into the combustion chamber 2 through the intake passageway, and fuel injected from a fuel injection valve 4 is supplied into the combustion chamber 2 via the intake passageway 3. A mixture of air and fuel supplied into the combustion chamber 2 burns due to ignition by an ignition plug 5. As the mixture burns within the combustion chamber 2, a piston 6 reciprocates, rotating a crankshaft 7 that is an output shaft of the engine 1.

After being burned in the combustion chamber 2, the mixture is sent out as an exhaust gas from the combustion chamber 2 into an exhaust passageway 8. The exhaust gas that passes through the exhaust passageway 8 is let out into the outside after harmful components of the exhaust gas, such as HCs, CO, NOx, etc., are removed by a three-way catalyst of a catalytic converter 16. The three-way catalyst has an oxygen storage function in order to effectively remove the foregoing three components from the exhaust gas. While the three-way catalyst is equipped with the oxygen storage function, a stoichiometric air/fuel ratio control of controlling the air/fuel ratio of the mixture so that the oxygen concentration in the catalyst atmosphere converges to the value of oxygen concentration occurring at the time of combustion of the mixture at the stoichiometric air/fuel ratio is performed. Therefore, with the three-way catalyst, the three components of exhaust gas, that is, NOx, HCs and CO, can be effectively removed.

Besides, the exhaust passageway 8 upstream of the catalytic converter 16 is provided with an air/fuel ratio sensor 17 as a pre-catalyst sensor that outputs a signal based on the oxygen concentration in exhaust gas, and the passageway downstream of the catalytic converter 16 is provided with an oxygen sensor 18 as a post-catalyst sensor that outputs a signal based on the oxygen concentration in exhaust gas.

Figure 2:
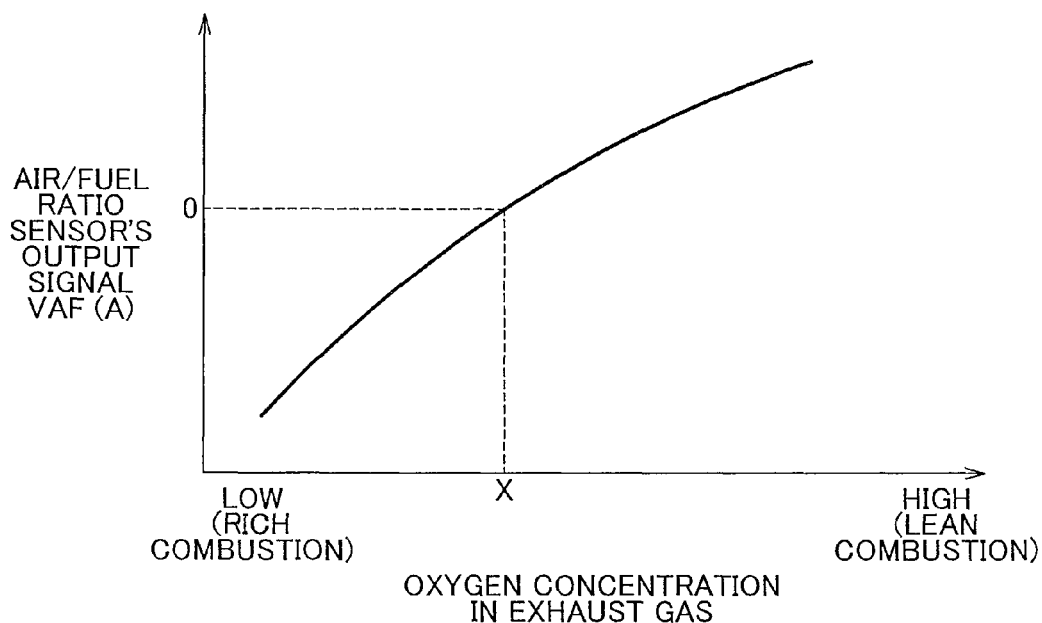
FIG. 2 is a graph showing changes in an output signal of an air/fuel ratio sensor relative to changes in the oxygen concentration in exhaust gas in accordance with the embodiment of the invention.

As shown in FIG. 2, the air/fuel ratio sensor 17 outputs a linear signal commensurate with the oxygen concentration in exhaust gas upstream of the catalyst. That is, the output signal VAF of the air/fuel ratio sensor 17 becomes smaller the lower the oxygen concentration in exhaust gas upstream of the catalyst. When the mixture at the stoichiometric air/fuel ratio is burned, the value of the output signal VAF becomes, for example, 0 (A), corresponding to the oxygen concentration X in exhaust gas at that time. Therefore, as the oxygen concentration in exhaust gas upstream of the catalyst becomes lower due to combustion of a mixture whose air/fuel ratio is richer than the stoichiometric air/fuel ratio (rich combustion), the value of the output signal VAF of the air/fuel ratio sensor 17 becomes smaller below the value 0 (A). Besides, as the oxygen concentration in exhaust gas upstream of the catalyst becomes higher due to combustion of a mixture whose air/fuel ratio is leaner than the stoichiometric air/fuel ratio (lean combustion), the value of the output signal VAF of the air/fuel ratio sensor 17 becomes larger above the value 0 (A).

Figure 3:
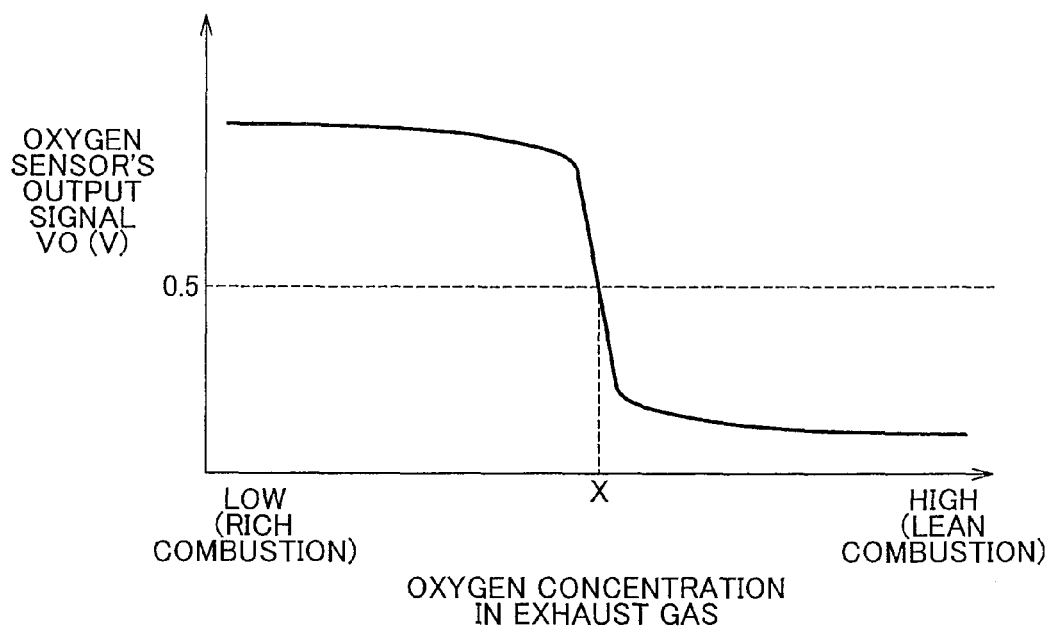
FIG. 3 is a graph showing changes in an output signal of an oxygen sensor relative to changes in the oxygen concentration in exhaust gas in accordance with the embodiment.

The oxygen sensor 18 outputs a rich signal or a lean signal according to the oxygen concentration in exhaust gas downstream of the catalyst, as shown in FIG. 3. Specifically, the value, of the output signal VO of the oxygen sensor 18 becomes, for example, 0.5 (v), when the oxygen concentration in exhaust gas downstream of the catalyst is equal to a value of the oxygen concentration (oxygen concentration X) that occurs when the mixture at the stoichiometric air/fuel ratio is burned. When the oxygen concentration in exhaust gas downstream of the catalyst is higher than the oxygen concentration X due to the fuel-lean combustion, the oxygen sensor 18 outputs the lean signal whose value is smaller than 0.5 (v). When the oxygen concentration in exhaust gas downstream of the catalyst increases above the foregoing oxygen concentration X, the value of the lean signal sharply decreases with respect to the increasing oxygen concentration in the lower side of the value 0.5 (v) in the vicinity of the oxygen concentration X whereas the decrease of the value of the lean signal with respect to the increasing oxygen concentration is gentle in a region apart from the oxygen concentration X.

When the oxygen concentration in exhaust gas downstream of the catalyst is lower than the oxygen concentration X due to the fuel-rich combustion, the oxygen sensor 18 outputs the rich signal whose value is greater than 0.5 (v). When the oxygen concentration in exhaust gas downstream of the catalyst decreases below the foregoing oxygen concentration X, the value of the rich signal sharply increases with respect to the decreasing oxygen concentration in the higher side of the value 0.5 (v) in the vicinity of the oxygen concentration X whereas the increase of the value of the rich signal with respect to the decreasing oxygen concentration is gentle in a region apart from the oxygen concentration X.

Next, an electrical construction of a catalyst degradation detection apparatus in accordance with the embodiment will be described with reference to FIG. 1. This catalyst degradation detection apparatus includes an electronic control unit 21 that executes various controls regarding the engine 1. The electronic control unit 21 includes: a CPU that executes various computation processes involved in the foregoing controls; a ROM that stores programs and data needed for the controls; a RAM that temporarily stores results of computations performed by the CPU, and the like; input/output ports for the inputting/outputting signals between the electronic control unit 21 and an external device; etc.

The air/fuel ratio sensor 17 and the oxygen sensor 18 as well as various sensors are connected to the input ports of the electronic control unit 21. The foregoing various sensors include: an accelerator pedal position sensor 28 that detects the amount of depression of an accelerator pedal 27 that is depressed by a driver of the motor vehicle (the accelerator depression amount); a throttle position sensor 30 that detects the degree of opening of the throttle valve 13 provided in the intake passageway 3 (the throttle opening degree); an air flow meter 32 that detects the amount of air taken into the combustion chamber 2 through the intake passageway 3; an intake air pressure sensor 33 that detects the pressure in the intake passageway 3 at the downstream side of the throttle valve 13 (the intake air pressure); a crank position sensor 34 that outputs a signal that corresponds to the rotation of the crankshaft 7 and that is used for the calculation of the engine rotation speed and the like; etc.

Drive circuits of the fuel injection valve 4, the ignition plug 5 and the throttle valve 13, and the like are connected to the output port of the electronic control unit 21. The electronic control unit 21 grasps the state of operation of the engine 1, such as the engine rotation speed, the engine load (that is the amount of air taken into the combustion chamber 2 per cycle of the engine 1), etc. on the basis of detection signals input from the various sensors. Incidentally, the engine rotation speed is found on the basis of the detection signal from the crank position sensor 34. The engine load is calculated from the engine rotation speed, and the amount of air taken into the engine 1 that is found on the basis of the detection signals from the accelerator pedal position sensor 28, the throttle position sensor 30, the air flow meter 32, etc. The electronic control unit 21 outputs command signals to the various drive circuits connected to the output port, according to the engine operation states such as the engine load and the engine rotation speed. Thus, a fuel injection amount control, an ignition timing control, an intake air amount control, etc. regarding the engine 1 are executed via the electronic control unit 21.

The foregoing stoichiometric air/fuel ratio control for effectively purifying the exhaust gas of the engine 1 by the three-way catalyst of the catalytic converter 16 is realized by adjusting the amount of fuel injection on the basis of the output signal VAF of the air/fuel sensor 17 and the output signal VO of the oxygen sensor 18. Specifically, the fuel injection amount of the engine 1 is increased or decreased on the basis of the output signal VAF of the air/fuel ratio sensor 17 so that the output signal VAF becomes equal to the value (0 (A) in this embodiment) thereof that occurs when the mixture at the stoichiometric air/fuel ratio is burned in the combustion chamber 2 of the engine 1. Due to this, the air/fuel ratio of the mixture in the combustion chamber 2 of the engine 1 is controlled so as to converge to the stoichiometric air/fuel ratio while fluctuating between the rich and lean sides of the stoichiometric air/fuel ratio. However, in the case where only the adjustment of the fuel injection amount commensurate with the output signal VAF of the air/fuel ratio sensor 17 is performed, there is still a possibility that the center of fluctuation of the air/fuel ratio of the engine 1 that fluctuates between the rich and lean sides so as to converge to the stoichiometric air/fuel ratio as described above will deviate from the stoichiometric air/fuel ratio, due to product variations of the air/fuel ratio sensor 17, or the like. In order to correct such a deviation, the fuel injection amount of the engine 1 is adjusted also according to the signal output by the oxygen sensor 18 so that the center of fluctuation of the air/fuel ratio of the engine 1 that fluctuates between the rich and lean sides due to the adjustment of the fuel injection amount commensurate with the output signal VAF of the air/fuel ratio sensor 17 becomes equal to the stoichiometric air/fuel ratio.

Next, the determination as to the presence or absence of degradation of the three-way catalyst of the catalytic converter 16 in this embodiment will be outlined. The determination as to the presence or absence of degradation of the three-way catalyst is performed by utilizing a phenomenon in which the oxygen storage function of the three-way catalyst declines with degradation of the three-way catalyst. That is, a maximum value of the amount of oxygen stored in the three-way catalyst which is determined by the oxygen storage function of the three-way catalyst (hereinafter, termed the oxygen storage amount) is found. On the basis of the found oxygen storage amount, it is determined whether or not degradation of the three-way catalyst is present.

To find the oxygen storage amount, an active air/fuel ratio control is performed in which the air/fuel ratio of the mixture in the combustion chamber 2 of the engine 1 is forced to switch between the rich and lean sides at every predetermined timing. If the air/fuel ratio of the engine 1 is switched between the rich and lean sides by the active air/fuel ratio control, a change that corresponds to the switching appears in the output signal VAF of the air/fuel ratio sensor 17. Then, a calculation is performed to find the amount of oxygen that is stored into the three-way catalyst or desorbed from the three-way catalyst during a period from when the foregoing change occurs in the output signal VAF of the air/fuel ratio sensor 17 to when a change that corresponds to the foregoing change in the air/fuel ratio occurs in the output signal VO of the oxygen sensor 18. For example, if the foregoing forced change in the air/fuel ratio is performed from the rich side to the lean side, oxygen is then stored into the three-way catalyst during the foregoing period. Then, the amount of oxygen stored into the three-way catalyst during the period is calculated, and the calculated amount of oxygen is determined as the oxygen storage amount of the catalyst. On the other hand, if the forced change in the air/fuel ratio is performed from the lean side toward the rich side, oxygen is then desorbed from the three-way catalyst during the period. Then, the amount of oxygen desorbed from the three-way catalyst during the period is calculated, and the calculated amount of oxygen is determined as the oxygen storage amount of the catalyst.

Then, in order to determine the presence or absence of degradation of the three-way catalyst, it is conceivable to compare the oxygen storage amount found at the time point of the end of the foregoing period (the time point when a change that corresponds to the change in the air/fuel ratio occurs in the output signal VO of the oxygen sensor 18) with a threshold value set for the determination regarding the degradation. Incidentally, the oxygen storage amount as an index for determining the presence or absence of degradation of the three-way catalyst may be, for example, at least one of a value that is found by changing the air/fuel ratio from the rich side to the lean side (an oxygen storage amount OSC1 found at the time of storage of oxygen) and a value that is found by changing the air/fuel ratio from the lean side to the rich side (an oxygen storage amount OSC2 found at the time of desorption of oxygen). If the oxygen storage amount for the determination regarding the degradation that is found as described above is less than the threshold value, it is conceivable to determine that there has been a decline in the oxygen storage function caused by degradation of the three-way catalyst, and therefore to determine that degradation of the three-way catalyst is present. On the other hand, if the foregoing oxygen storage amount is greater than or equal to the threshold value, it is conceivable to determine that there has not been a decline in the oxygen storage amount caused by degradation of the three-way catalyst, and therefore to determine that the three-way catalyst has not degraded (is normal).

As for the determination as to the presence or absence of degradation of the three-way catalyst, it is conceivable to perform the determination at least once during the period from a start of operation of the engine 1 till the end of operation thereof. Incidentally, after the determination as to the presence or absence of degradation of the three-way catalyst is completed, the oxygen storage amount found for use for the determination is reset to "0".

Herein, calculation of the oxygen storage amount during execution of the foregoing active air/fuel ratio control will be described in detail with reference to FIG. 4 and FIG. 5. The active air/fuel ratio control is started on the basis of satisfaction of all of various execution conditions, including a condition that the determination as to the presence or absence of degradation of the three-way catalyst has never been completed following the beginning of the starting of the engine 1, a condition that the engine 1 is being steadily operated, and a condition that the temperature of the three-way catalyst is in an activation temperature range. Besides, during execution of the active air/fuel ratio control, if any one of the foregoing execution conditions is unsatisfied, or if the calculation and the measurement of various kinds of values which are purposes of the execution of the active air/fuel ratio control have been completed, the execution of the active air/fuel ratio control is stopped.

Figure 4:
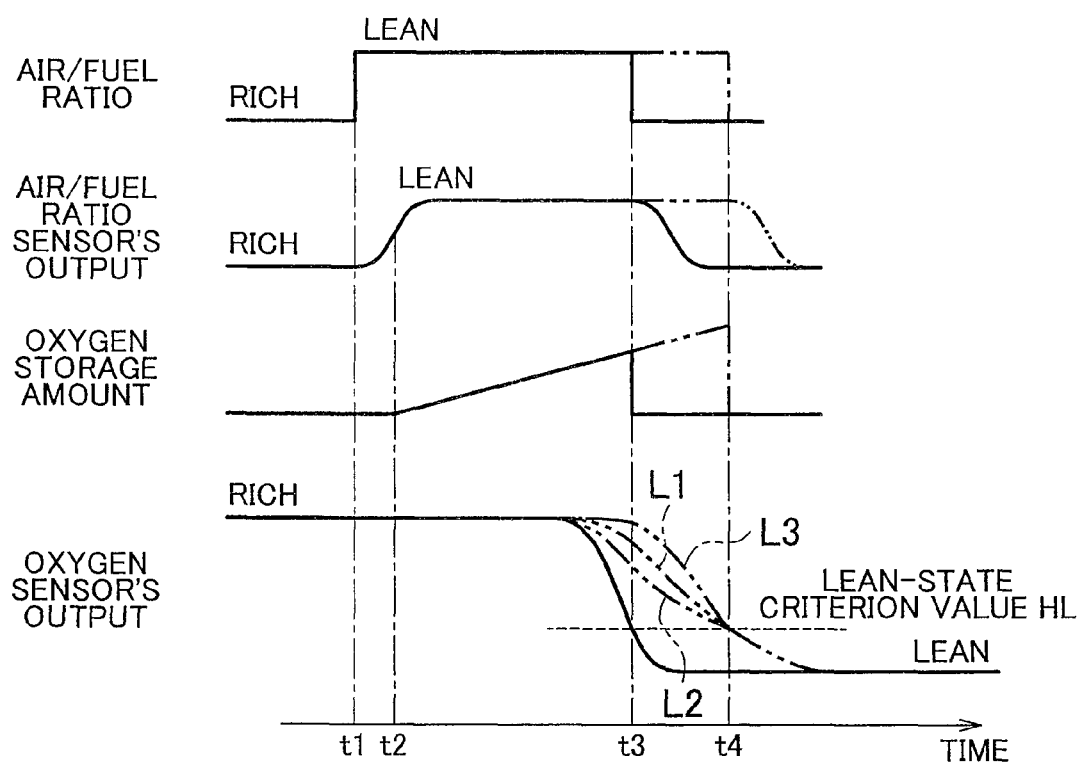
FIG. 4 is a time chart showing changes in the air/fuel ratio of the engine, changes in the output signal of the air/fuel ratio sensor, changes in the oxygen storage amount, found, and changes in the output signal of the oxygen sensor in an active air/fuel ratio control in accordance with the embodiment.

In the active air/fuel ratio control, if the air/fuel ratio of the engine 1 is forced to change from the rich side to the lean side at a timing t1 in FIG. 4, the output signal VAF of the air/fuel ratio sensor 17, correspondingly to the forced change in the air/fuel ratio, increases as shown in a time chart of the output of the air/fuel ratio sensor in FIG. 4. Incidentally, a timing t2 in the time chart of the output of the air/fuel ratio sensor in FIG. 4 is a timing at which the output signal VAF of the air/fuel ratio sensor 17 comes to have a value that corresponds to the oxygen concentration in exhaust gas occurring when the mixture at the stoichiometric air/fuel ratio is burned in the combustion chamber 2 of the engine 1. From the timing t2 on in FIG. 4, exhaust gas whose oxygen concentration is high passes through the three-way catalyst, corresponding to the change in the air/fuel ratio to the lean side. However, oxygen in exhaust gas is stored into the three-way catalyst. While the storage is being performed, the oxygen concentration in exhaust gas downstream of the catalyst remains low, so that as shown by a solid line in the time chart of the output of the oxygen sensor in FIG. 4, a change that corresponds to the change in the air/fuel ratio to the lean side does not occur in the output signal VO of the oxygen sensor 18. Then, when the three-way catalyst becomes unable to store any more oxygen and therefore exhaust gas whose oxygen concentration is high begins to flow downstream of the catalyst, a change that corresponds to the change in the air/fuel ratio to the lean side occurs in the output signal VO of the oxygen sensor 18. Incidentally, as for the determination that a change that corresponds to the change in the air/fuel ratio to the lean side has occurred in the output signal VO of the oxygen sensor 18, it is possible to make the determination on condition that the output signal VO has reached a lean-state criterion value HL set for the determination of occurrence of the change that corresponds to the change in the air/fuel ratio to the lean side. When the output signal VO reaches the lean-state criterion value HL as stated above (at a timing t3), the air/fuel ratio of the engine 1 is forced to switch form the lean side to the rich side.

The total value of the amount of oxygen stored into the three-way catalyst during the period (t2 to t3) from when a change in the air/fuel ratio from the rich side to the lean side occurs in the output signal VAF of the air/fuel ratio sensor 17 to when a change that corresponds to the change in the air/fuel ratio occurs in the output signal VO of the oxygen sensor 18 is a value that represents the maximum value (oxygen storage amount) of the amount of oxygen stored in the three-way catalyst. This oxygen storage amount is found in the following manner during the period (t2 to t3). That is, during the period (t2 to t3), an oxygen storage amount $\Delta OSC$ is calculated as the amount of oxygen stored into the three-way catalyst in every infinitesimal time, by using the following expression (1):

$$\Delta OSC = (\Delta A/F) \cdot Q \cdot K \qquad (1)$$

$\Delta OSC$: oxygen storage amount in every infinitesimal time
$\Delta A/F$: difference in the air/fuel ratio
Q: fuel injection amount
K: proportion of oxygen In the expression (1), the difference $\Delta A/F$ in the air/fuel ratio represents an absolute value of a value obtained by subtracting the stoichiometric air/fuel ratio from the air/fuel ratio that is found from the output signal VAF of the air/fuel ratio sensor 17. Besides, in the expression (1), the fuel injection amount Q represents the amount of fuel injection of the engine 1, that is, the amount of fuel injected from the fuel injection valve 4, which brings about the air/fuel ratio that is found on the basis of the output signal VAF of the air/fuel ratio sensor 17. Furthermore, the proportion K of oxygen in the expression (1) represents the proportion of oxygen contained in the air. The proportion K of oxygen used herein is, for example, a fixed value of "0.23". Then, the oxygen storage amount $\Delta OSC$ in every infinitesimal time calculated using the expression (1) is integrated over the foregoing period (t2 to t3). The value obtained by the integration is found as the amount of oxygen stored in the three-way catalyst. Therefore, the value found by the foregoing integration at the end time point of the period (t2 to t3) is the maximum value of the amount of oxygen that can be stored in the three-way catalyst (oxygen storage amount). The thus-found oxygen storage amount is an oxygen storage amount OSC1 that is found when the three-way catalyst stores oxygen.

Figure 5:
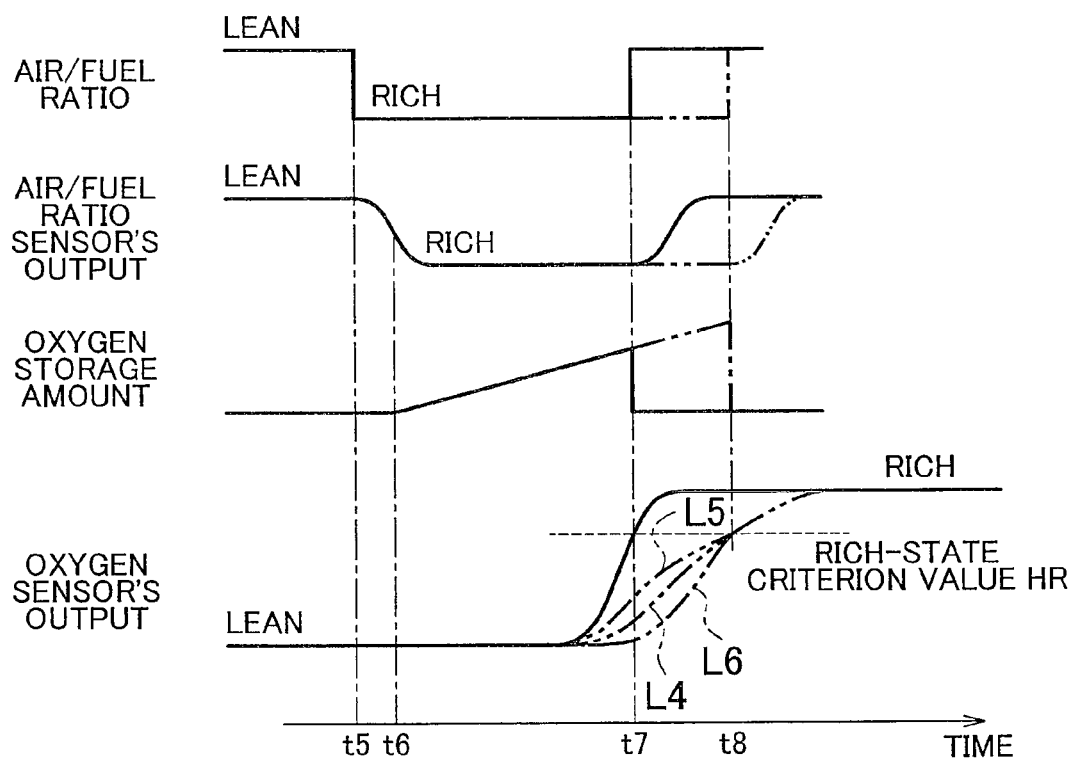
FIG. 5 is a time chart showing changes in the air/fuel ratio of the engine, changes in the output signal of the air/fuel ratio sensor, changes in the oxygen storage amount found, and changes in the output signal of the oxygen sensor in the active air/fuel ratio control in accordance with the embodiment.

In the active air/fuel ratio control, when the air/fuel ratio of the engine 1 is forced to change from the lean side to the rich side at a timing t5 in a time chart of the output of the air/fuel ratio sensor in FIG. 5, the output signal VAF of the air/fuel ratio sensor 17 decreases corresponding to the change in the air/fuel ratio, as shown in FIG. 5. A timing t6 in the time chart of the output of the air/fuel ratio sensor in FIG. 5 is a timing at which the output signal VAF of the air/fuel ratio sensor 17 comes to have a value that corresponds to the oxygen concentration in exhaust gas that occurs when the mixture at the stoichiometric air/fuel ratio is burned in the combustion chamber 2 of the engine 1. Incidentally, the switching of the air/fuel ratio of the engine 1 from the rich side to the lean side is performed, for example, at the time point when output signal VO of the oxygen sensor 18 reaches the lean-state criterion value HL (the timing t3 in FIG. 4). From the timing t5 on in FIG. 5, exhaust gas whose oxygen concentration is low passes through the three-way catalyst, corresponding to the change in the air/fuel ratio to the rich side passes. In this state, oxygen stored in the three-way catalyst is desorbed therefrom and is released into exhaust gas. Therefore, while the desorption of oxygen from the three-way catalyst is occurring, the oxygen concentration in exhaust gas downstream of the catalyst remains high, so that a change that corresponds to the change in the air/fuel ratio to the rich side does not occur in the output signal VO of the oxygen sensor 18, as shown by a solid line in the time chart of the output of the oxygen sensor in FIG. 5. Then, the oxygen stored in the three-way catalyst runs out and no more oxygen can be released, so that exhaust gas whose oxygen concentration is low begins to flow downstream of the catalyst. At this time, a change that corresponds to the change in the air/fuel ratio to the rich side occurs in the output signal VO of the oxygen sensor 18. Incidentally, as for the determination that a change that corresponds to the change in the air/fuel ratio to the rich side has occurred in the output signal VO of the oxygen sensor 18, it is possible to make the determination on condition that the output signal VO has reached a rich-state criterion value HR set for the determination of occurrence of the change that corresponds to the change in the air/fuel ratio to the rich side. When the output signal VO reaches the rich-state criterion value HR as stated above (at a timing t7), the air/fuel ratio of the engine 1 is forced to switch from the rich side to the lean side.

The total value of the amount of oxygen desorbed from the three-way catalyst during the period (t6 to t7) from when a change in the air/fuel ratio from the lean side to the rich side occurs in the output signal VAF of the air/fuel ratio sensor 17 to when a change that corresponds to the change in the air/fuel ratio occurs in the output signal VO of the oxygen sensor 18 is a value that represents the maximum value (oxygen storage amount) of the amount of oxygen stored in the three-way catalyst. This oxygen storage amount is found during the foregoing period (t6 to t7) by using substantially the same technique as used during the period (t2 to t3) shown in FIG. 4. That is, during the period (t6 to t7), an oxygen storage amount ΔOSC is calculated as the amount of oxygen stored into the three-way catalyst in every infinitesimal time, by using the foregoing expression (1). Then, the oxygen storage amount ΔOSC in every infinitesimal time calculated using the expression (1) is integrated over the foregoing period (t6 to t7). The value obtained by the integration is found as the amount of oxygen desorbed from the three-way catalyst. Therefore, the value found by the foregoing integration at the end time point of the period (t6 to t7) is the maximum value (oxygen storage amount) of the amount of oxygen that can be stored in the three-way catalyst. The thus-found oxygen storage amount is an oxygen storage amount OSC2 that is found when oxygen is desorbed from the three-way catalyst.

Incidentally, the active/air/fuel ratio control is ended after the oxygen storage needed for determining the presence or absence of degradation of the three-way catalyst is found. That is, in the case where the oxygen storage amount needed for determining the presence or absence of degradation of the three-way catalyst is one of the oxygen storage amount OSC1 and the oxygen storage amount OSC2, the active air/fuel ratio control is ended after that the oxygen storage amount is found. In the case where the oxygen storage amount needed for determining the presence or absence of degradation of the three-way catalyst is each one of the oxygen storage amount OSC1 and the oxygen storage amount OSC2, the active air/fuel ratio control is ended after the oxygen storage amounts OSC1 and OSC2 are found.

By the way, in the determination as to the presence or absence of degradation of the three-way catalyst, the oxygen storage amount found as described above sometimes deviates from a proper value because of being affected by deterioration of the responsiveness of the change in the output signal VO of the oxygen sensor 18 to a change in the oxygen concentration in exhaust gas downstream of the catalyst.

For example, if the deterioration of the responsiveness of the oxygen sensor 18 appears in the output signal VO of the oxygen sensor 18 in the form of a change from the transition shown by the solid line in the time chart of the output of the oxygen sensor in FIG. 4 to the transition shown by a two-dot chain line L1 in the time chart in FIG. 4, the period for which the oxygen storage amount is calculated increases from a period from t2 to t3 to a period from t2 to t4. In consequence, the oxygen storage amount OSC1 found at the end time point of the period from t2 to t4 is a value (value at the timing t4) that is excessively larger than a proper value (value at the timing t3), as shown by the two-dot chain line in the time chart of the oxygen storage amount in FIG. 4. Besides, if the deterioration of the responsiveness of the oxygen sensor 18 appears in the output signal VO of the oxygen sensor 18 in the form of a change from the transition shown by a solid line in the time chart of the output of the oxygen sensor in FIG. 5 to the transition shown by a two-dot chain line L4 in the same time chart, the period for which the oxygen storage amount is calculated increases from a period from t6 to t7 to a period from t6 to t8. In consequence, the oxygen storage amount OSC2 found at the end time point of the period (t6 to t8) is a value (value at the timing t8) that is excessively larger than a proper value (value at the timing t7), as shown by a two-dot chain line in the time chart of the oxygen storage amount in FIG. 5. As in the above, if the presence or absence of degradation of the three-way catalyst is determined through the use of the oxygen storage amount whose value is deviated from the proper value, an error may sometimes occur in the determination.

Therefore, in this embodiment, the responsiveness of the change in the output signal VO of the oxygen sensor 18 to a change in the oxygen concentration in exhaust gas downstream of the catalyst is measured. Then, the oxygen storage amount for use for determining the presence or absence of degradation of the three-way catalyst is directly corrected by reduction so that the oxygen storage amount is reduced more greatly the more deteriorated the measured responsiveness is relative to a reference value. Due to this, the post-correction oxygen storage amount for use for determining the presence or absence of degradation of the three-way catalyst is restrained from deviating from a proper value due to deterioration of the responsiveness of the oxygen sensor 18.

With regard to the measurement of the responsiveness of the oxygen sensor 18, it is conceivable to perform the measurement as follows. That is, when the air/fuel ratio of the engine 1 changes between the rich side and the lean side a change that corresponds to such change in the air/fuel ratio occurs in the output signal VO of the oxygen sensor 18, a response time from when the output signal VO starts changing to when the output signal VO reaches the lean-state criterion value HL or the rich-state criterion value HR is measured as a value that corresponds to the foregoing responsiveness. The response time measured in this manner becomes greater in value as the responsiveness of the oxygen sensor 18 deteriorates. In this case, the greater the response time becomes relative to the value (that corresponds to the foregoing reference value) of the response time that occurs when the responsiveness of the oxygen sensor 18 has not deteriorated at all, the more largely corrected to the reduction side the oxygen storage amount for use for determining the presence or absence of degradation of the three-way catalyst.

The effect of deterioration of the responsiveness of the oxygen sensor 18 on the output signal VO does not necessarily appear in manners as shown by the two-dot chain line L1 in the time chart of the output of the oxygen sensor in FIG. 4 or the two-dot chain line L4 in the time chart of the output of the oxygen sensor in FIG. 5, but may possibly appear in a manner that is different from those shown by the two-dot chain lines L1 and L4, depending on the state of operation of the engine 1, or the like. For example, even when the degree of deterioration of the responsiveness of the oxygen sensor 18 is substantially equal to the degree of deterioration shown by the two-dot chain line L1 in the time chart of the output of the oxygen sensor in FIG. 4, the effect of deterioration of the responsiveness of the oxygen sensor 18 may possibly appear in the output signal VO of the oxygen sensor 18, for example, in a manner as shown by two-dot chain lines L2 and L3, depending on the state of operation of the engine 1, or the like. In other words, there is a possibility that the effect of deterioration of the responsiveness of the oxygen sensor 18 that appears in the output signal VO of the oxygen sensor 18 may vary as shown by the two-dot chain lines L2 and L3 in the time chart of the output of the oxygen sensor in FIG. 4. Besides, even when the degree of deterioration of the responsiveness of the oxygen sensor 18 is substantially equal to the degree of deterioration shown by the two-dot chain line L4 in the time chart of the output of the oxygen sensor in FIG. 5, the effect of deterioration of the responsiveness of the oxygen sensor 18 may possibly appear in the output signal VO of the oxygen sensor 18, for example, in a manner as shown by two-dot chain lines L5 and L6. In other words, there is a possibility that the effect of deterioration of the responsiveness of the oxygen sensor 18 that appears in the output signal VO of the oxygen sensor 18 may vary as shown by the two-dot chain lines L5 and L6 in the time chart of the output of the oxygen sensor in FIG. 5, depending on the state of operation of the engine 1, or the like.

If as described above, the lean-state criterion value HL or the rich-state criterion value HR is corrected on the basis of deterioration of the responsiveness of the oxygen sensor 18 and therefore the present responsiveness of the oxygen sensor 18 is reflected in the oxygen storage amount OSC1 or OSC2 that is found for use for determining the presence or absence of degradation of the three-way catalyst, the following inconveniences occur. That is, when the effect of deterioration of the responsiveness of the oxygen sensor 18 that appears in the output signal VO of the oxygen sensor 18 varies depending on the state of operation of the engine 1 or the like, the oxygen storage amount OSC1 or OSC2 reflecting the responsiveness of the oxygen sensor has a value that is deviated from a proper value. Then, since there is possibility that the presence or absence of degradation of the three-way catalyst may be determined on the basis of the oxygen storage amount OSC1 or OSC2 deviated from the proper value, it cannot be clearly said that a result of the determination is definitely proper.

In this respect, in this embodiment, even if the effect of deterioration of the responsiveness of the oxygen sensor 18 that appears in the output signal VO of the oxygen sensor 18 varies depending on the state of operation of the engine 1 or the like as described above, the variation can be prevented from resulting in variation of the post-correction oxygen storage amount that is provided for use for determining the presence or absence of degradation of the three-way catalyst. This is because, in the embodiment, after the responsiveness of the oxygen sensor 18 is measured, the oxygen storage amount for use for determining the presence or absence of degradation of the three-way catalyst is directly corrected on the basis of the responsiveness of the oxygen sensor 18. As a result, even if the effect of deterioration of the responsiveness of the oxygen sensor 18 that appears in the output signal VO of the oxygen sensor 18 varies as described above, the post-correction oxygen storage amount is restrained from being deviated from the proper value. Therefore, by determining the presence or absence of degradation of the three-way catalyst on the basis of the post-correction oxygen storage amount, it is possible to properly determine the presence or absence of degradation of the three-way catalyst irrespective of variations in the effect of deterioration of the responsiveness of the oxygen sensor 18 that appears in the signal of the oxygen sensor 18.

Figure 6:
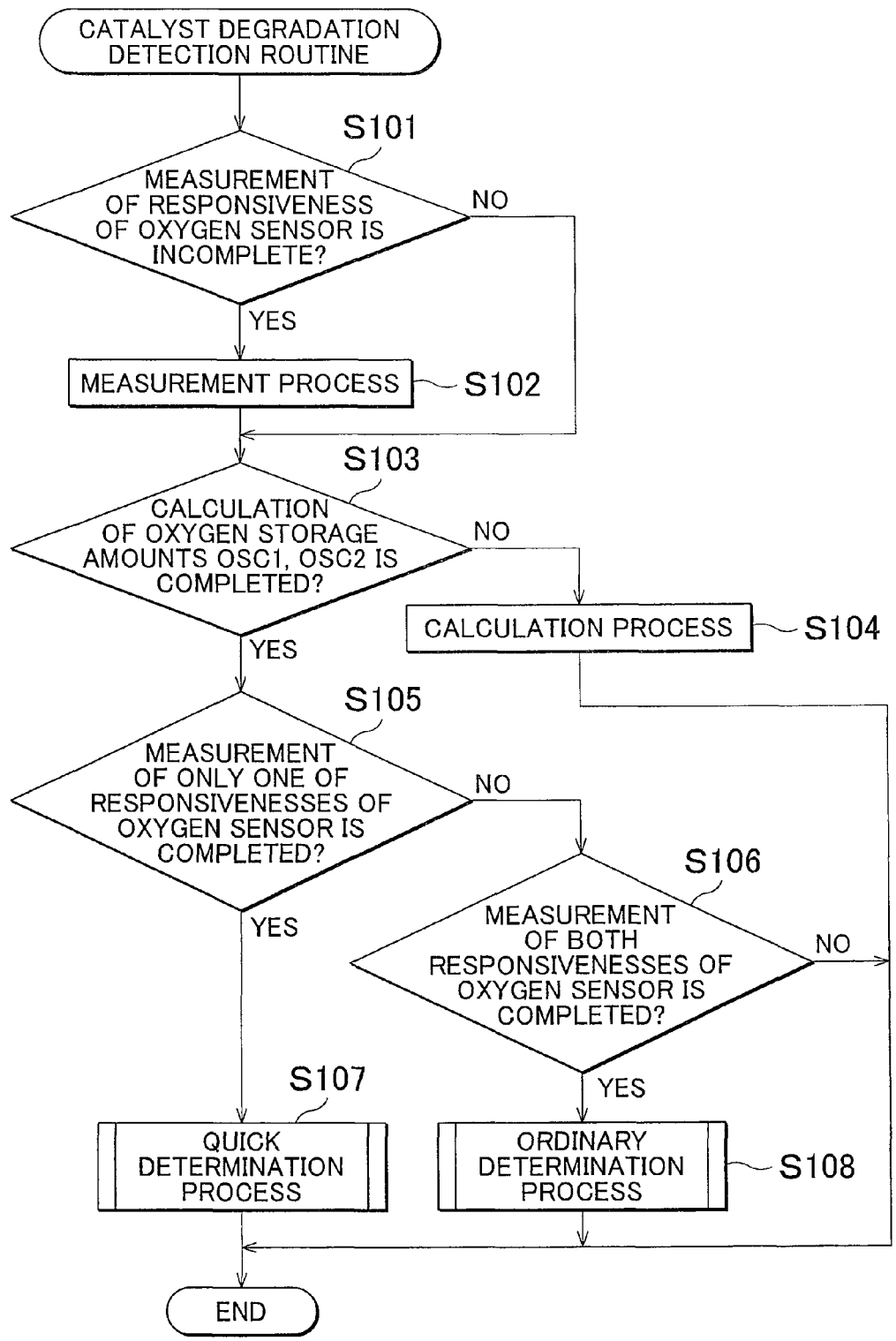
FIG. 6 is a flowchart showing a procedure of determining the presence or absence of degradation of a three-way catalyst in accordance with the embodiment.

Next, a detailed procedure of determining the presence or absence of degradation of the three-way catalyst will be fully described with reference to the flowchart in FIG. 6 that shows a catalyst degradation detection routine. This catalyst degradation detection routine is executed via the electronic control unit 21, for example, periodically by an interrupt generated at every predetermined time.

In the catalyst degradation detection routine, firstly a process (S101 and S102) of measuring the responsiveness of the oxygen sensor 18, and a process (S103 and S104) of calculating the oxygen storage amount OSC1 or OSC2 are executed.

In order to accurately determine the presence or absence of degradation of the three-way catalyst, it is preferable that each of the oxygen storage amounts OSC1 an OSC2 for use for the determination be corrected according to the responsiveness of the oxygen sensor 18 as follows. That is, the oxygen storage amount OSC1 (the value found at the time of storage of oxygen) is corrected on the basis of the responsiveness of the output signal VO of the oxygen sensor 18 to changes to the lean side, and the oxygen storage amount OSC2 (the value found at the time of desorption of oxygen) is corrected on the basis of the responsiveness of the output signal VO of the oxygen sensor 18 to changes to the rich side. Then, on the basis of both the oxygen storage amount OSC1 and the oxygen storage amount OSC2 corrected in this manner, the presence or absence of degradation of the three-way catalyst is determined. This is more preferable in terms of making the determination accurate.

Therefore, in the process (S101 and S102) of measuring the responsiveness of the oxygen sensor 18, measurement of both the responsiveness of the output signal VO of the oxygen sensor 18 to changes to the lean side and the responsiveness of the output signal VO of the oxygen sensor 18 to changes to the rich side is performed. Concretely, in the process of S101, it is determined whether or not the measurement of the responsiveness of the oxygen sensor 18 to changes to the lean side or the responsiveness thereof to changes to the rich side is still incomplete. If an affirmative determination is made herein, it is determined that at least one of the responsiveness to changes to the lean side and the responsiveness to changes to the rich side has not been measured, and a measurement process (S102) for measuring the at least one of the responsivenesses that has not been measured is executed.

In the measurement process of S102, for the purpose of measuring the responsiveness of the oxygen sensor 18, the active air/fuel ratio control is executed when an execution condition for the active air/fuel ratio control is satisfied. In the active air/fuel ratio control, the responsiveness of the oxygen sensor 18 to changes to the lean side is measured when the air/fuel ratio of the engine 1 is forced to switch from the rich side to the lean side, and the responsiveness of the oxygen sensor 18 to changes to the rich side is measured when the air/fuel ratio of the engine 1 is forced to switch from the lean side to the rich side. Besides, if the responsiveness of the oxygen sensor 18 is measured not only at the time of execution of the active air/fuel ratio control but at all possible opportunities, the measurement can be completed during an earlier period. Examples of the opportunities other than the time of execution of the active air/fuel ratio control at which the measurement of the responsiveness can be performed include when during the fuel-cut control of the engine 1, the fuel injection from the fuel injection valve 4 has been stopped and therefore the air/fuel ratio of the engine 1 changes from the rich side to the lean side. Incidentally, the stop of the fuel injection in the fuel-cut control is executed more frequently than the active air/fuel ratio control that is executed upon satisfaction of the execution condition for the control. In the process of S102, the responsiveness of the oxygen sensor 18 to changes to the lean side is measured also when the air/fuel ratio of the engine 1 changes from the rich side to the lean side due to the stop of the fuel injection in the fuel-cut control.

After execution of the process (S101 and S102) of measuring the responsiveness of the oxygen sensor 18, the process (S103 and S104) of calculating the oxygen storage amounts OSC1 and OSC2 is executed. Specifically, in the process of S103, it is determined whether or not both the oxygen storage amounts OSC1 and OSC2 have already been calculated. If a negative determination is made in this step, a calculation process (S104) of calculating the oxygen storage amount OSC1 and/or the oxygen storage amount OSC2 that has not been calculated is executed.

In the calculation process of S104, the active air/fuel ratio control is executed for the purpose of calculating the oxygen storage amount OSC1 and/or the oxygen storage amount OSC2, when the execution condition for the active air/fuel ratio control is satisfied. Then, during the active air/fuel ratio, control, when the air/fuel ratio of the engine 1 is forced to switch from the rich side to the lean side, the oxygen storage amount OSC1 is calculated as an oxygen storage amount found when oxygen is stored into the three-way catalyst. Besides, during the active air/fuel ratio control, when the air/fuel ratio of the engine 1 is forced to switch from the lean side to the rich side, the oxygen storage amount OSC2 is calculated as an oxygen storage amount found when oxygen desorbs from the three-way catalyst.

In order to accurately determine the presence or absence of degradation of the three-way catalyst, it is preferable to determine the presence or absence of degradation of the three-way catalyst on the basis of both the oxygen storage amount OSC1 corrected on the basis of the responsiveness of the oxygen sensor 18 to changes to the lean side and the oxygen storage amount OSC2 corrected on the basis of the responsiveness of the oxygen sensor 18 to changes to the rich side, as described above. However, if this manner of determining the presence or absence of degradation of the three-way catalyst is to be realized, it is inevitable that a long time is required before the determination is completed. This is because if both the responsiveness of the oxygen sensor 18 to changes to the lean side which is for use for correction of the oxygen storage amount OSC1 and the responsiveness of the oxygen sensor 18 to changes to the rich side which is for use for correction of the oxygen storage amount OSC2 are to be measured, the completion of the measurement of both the responsivenesses requires a long time.

Specifically, as for the measurement of the responsiveness of the oxygen sensor 18 to changes to the lean side and the measurement of the responsiveness thereof to changes to the rich side, it is highly likely that the frequency of the measurement of one of the two responsivenesses is different from the frequency of the measurement of the other responsiveness. Therefore, there occurs a situation in which one of the responsiveness of the oxygen sensor 18 to changes to the lean side and the responsiveness thereof to changes to the rich side can be measured but the other cannot be measured. Hence, the completion of the responsiveness measurement requires a long time. Incidentally, in this embodiment, occurrence of a situation in which the measurement of the responsiveness of the oxygen sensor 18 to changes to the rich side cannot be completed while the measurement of the responsiveness thereof to changes to the lean side is completed is highly likely. This is because the active air/fuel ratio control during which both the responsiveness to changes to the lean side and the responsiveness to changes to the rich sided can be measured is executed relatively less frequently whereas the stop of the fuel injection in the fuel-cut control during which only the responsiveness to changes to the lean side can be measured is executed highly frequently.

Taking the foregoing circumstances into account, the catalyst degradation detection routine is performed as follows. After an affirmative determination is made in the process of S103, that is, after it is determined that both the oxygen storage amounts OSC1 and OSC2 have already been calculated, a process starting at S105 in which the presence or absence of degradation of the three-way catalyst is determined so as to promptly complete the determination as to the presence or absence of degradation of the three-way catalyst and also prevent decline in the accuracy of the determination is executed.

Concretely, it is firstly determined (S105) whether or not it is the case that only one of the responsiveness of the oxygen sensor 18 to changes to the lean side and the responsiveness of the oxygen sensor 18 to changes to the rich side has been measured, and it is determined (S106) whether or not both the responsivenesses have been measured.

Then, if it is determined that both the responsiveness of the oxygen sensor 18 to changes to the lean side and the responsiveness thereof to changes to the rich side have been measured (YES in S106 following NO in S105), an ordinary determination process of determining the presence or absence of degradation of the three-way catalyst so as to make an accurate determination is executed (S108). In this ordinary determination process (S108), the oxygen storage amount OSC1 is corrected on the basis of the responsiveness of the oxygen sensor 18 to changes to the lean side, and the oxygen storage amount OSC2 is corrected on the basis of the responsiveness of the oxygen sensor 18 to changes to the rich side. Then, using both the post-correction oxygen storage amount OSC1 and the post-correction oxygen storage amount OSC2, the determination as to the presence or absence of degradation of the three-way catalyst is executed.

Specifically, the post-correction oxygen storage amount OSC1 is compared with a predetermined threshold value, and the post-correction oxygen storage amount OSC2 is compared with a predetermined threshold value. If the post-correction oxygen storage amount OSC1 is less than the threshold value or the post-correction oxygen storage amount OSC2 is less than the threshold value, it is determined that degradation of the three-way catalyst is present. Besides, if the post-correction oxygen storage amount OSC1 is greater than or equal to the threshold value and the post-correction oxygen storage amount OSC2 is greater than or equal to the threshold value, it is determined that degradation of the three-way catalyst is not present (the three-way catalyst is normal). By determining the presence or absence of degradation of the three-way catalyst in the foregoing manner, accurate results of the determination can be obtained.

On the other hand, if it is determined that only one of the responsiveness of the oxygen sensor 18 to changes to the lean side and the responsiveness of the oxygen sensor 18 to changes to the rich side has been measured (YES in S105), a quick determination process of determining the presence or absence of degradation of the three-way catalyst so as to quickly complete the determination while achieving a certain degree of accuracy of the determination is executed (S107). Hereinafter, details of the quick determination process (S107) will be described with reference to a flowchart in FIG. 7 which shows the quick determination process routine. This quick determination process routine is executed via the electronic control unit 21 every time the operation proceeds to the process of S107 in the catalyst degradation detection routine (FIG. 6).

Figure 7:
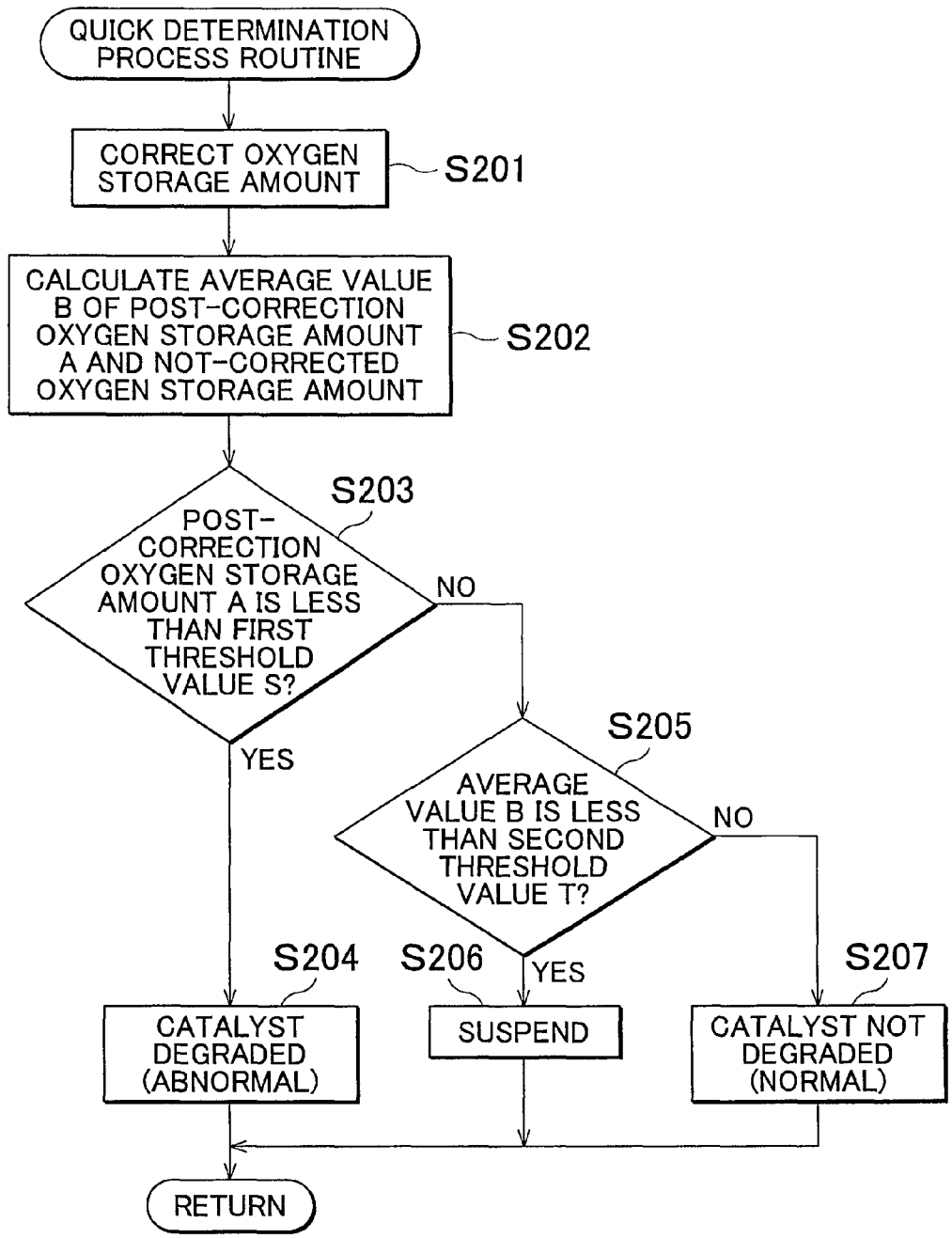
FIG. 7 is a flowchart showing an execution procedure of a quick determination process in accordance with the embodiment.

In the quick determination process routine shown in FIG. 7, of the responsiveness of the oxygen sensor 18 to changes to the lean side and the responsiveness thereof to changes to the rich side, the responsiveness that has already been measured is used as a basis to correct the oxygen storage amount (OSC1 of OSC2) that corresponds to that responsiveness (S201). For example, if only the responsiveness of the oxygen sensor 18 to changes to the lean side has already been measured, the oxygen storage amount OSC1 is corrected on that responsiveness. Incidentally, the oxygen storage amount that has been corrected in the process of S201 is hereinafter termed the post-correction oxygen storage amount A. After that, an average value B of the oxygen storage amount that corresponds to the responsiveness that has not yet been measured and the post-correction oxygen storage amount A is calculated (S202). In the foregoing example, the average value B is calculated from the post-correction oxygen storage amount OSC1 (that corresponds to the post-correction oxygen storage amount A) and the oxygen storage amount OSC2 that has not been corrected on the basis of the responsiveness. After the post-correction oxygen storage amount A and the average value B are calculated, the presence or absence of degradation of the three-way catalyst is determined (S203 to S207) on the basis of comparison of the post-correction oxygen storage amount A with a predetermined first threshold value S and comparison of the average value B with a predetermined second threshold value T that is greater than the first threshold value S.

Specifically, it is determined whether or not the post-correction oxygen storage amount A is less than the first threshold value S (S203). If an affirmative determination is made in S203, then it is determined that the three-way catalyst has degraded (is abnormal) (S204). On the other hand, if a negative determination is made in S203 and therefore it is determined that the post-correction oxygen storage amount A is greater than or equal to the first threshold value S, it is then determined whether or not the average value B is less than the second threshold value T (S205). If a negative determination is made in this step, it is determined that the three-way catalyst has not been degraded (is normal) (S207). On the other hand, if an affirmative determination is made in S205, the determination as to the presence or absence of degradation of the three-way catalyst is suspended (S206). Incidentally, in this quick determination process, the results of the determination as to the presence or absence of degradation of the three-way catalyst based on comparison of the post-correction oxygen storage amount A with the first threshold value S and comparison of the average value B with the second threshold value T can be summarized as in a table in FIG. 8.

By carrying out the quick determination process, the presence or absence of degradation of the three-way catalyst can be determined if only one of the responsiveness of the oxygen sensor 18 to changes to the lean side and the responsiveness thereof to changes to the rich side has been measured. Therefore, the determination can be completed promptly and early.

Besides, the determination as to the presence or absence of degradation of the three-way catalyst is performed not only on the basis of the oxygen storage amount corrected on the basis of the responsiveness of the oxygen sensor 18 (post-correction oxygen storage amount A), but also on the basis of the average value B of the post-correction oxygen storage amount A and an oxygen storage amount that corresponds to the unmeasured one of the two types of responsivenesses of the oxygen sensor 18. In the case where the determination is performed by taking into account not only the post-correction oxygen storage amount A but also the average value B, the decline in the accuracy of the determination as to the presence or absence of degradation of the three-way catalyst which is caused by the determination based on only the post-correction oxygen storage amount A is restrained.

According to the embodiment detailed above, the following effects can be achieved. A first effect will be described. The presence or absence of degradation of the three-way catalyst is determined on the basis of the maximum value of the amount of oxygen stored in the three-way catalyst (oxygen storage amount). To perform this determination as to the presence or absence of degradation of the three-way catalyst, the oxygen storage amount is found, and the responsiveness of the change in the output signal VO of the oxygen sensor 18 to a change in the oxygen concentration in exhaust gas downstream of the catalyst is measured. Then, the oxygen storage amount for use for determining the presence or absence of degradation of the three-way catalyst is directly corrected by reduction so that the oxygen storage amount is reduced more greatly the more deteriorated the measured responsiveness is relative to a reference value. Therefore, even if the effect of deterioration of the responsiveness of the oxygen sensor 18 that appears in the output signal VO of the oxygen sensor 18 varies depending on the state of operation of the engine 1 as shown by the two-dot chain lines L2 and L3 in the time chart of the output of the oxygen sensor in FIG. 4 or the two-dot chain lines L5 and L6 in the time chart of the output of the oxygen sensor in FIG. 5, the variation can be restrained from resulting in variation of the post-correction oxygen storage amount for use for determining the presence or absence of degradation of the three-way catalyst. In consequence, when the effect of deterioration of the responsiveness of the oxygen sensor 18 that appears in the output signal VO of the oxygen sensor 18 varies as described above, the post-correction oxygen storage amount is restrained from becoming deviated from the proper value. Therefore, by determining the presence or absence of degradation of the three-way catalyst on the basis of the post-correction oxygen storage amount, it is possible to properly determine the presence or absence of degradation of the three-way catalyst irrespective of variations in the effect of deterioration of the responsiveness of the oxygen sensor 18 that appears in the signal of the oxygen sensor 18.

Next, a second effect will be described. When only one of the responsiveness of the oxygen sensor 18 to changes to the lean side and the responsiveness thereof to changes to the rich side has been measured, the quick determination process is carried out so as to complete the determination as to the presence or absence of degradation of the three-way catalyst while achieving a certain degree of accuracy of the determination. By carrying out the quick determination process, the presence or absence of degradation of the three-way catalyst can be determined if only one of the responsiveness of the oxygen sensor 18 to changes to the lean side and the responsiveness thereof to changes to the rich side has been measured. Therefore, the determination can be completed promptly and early. Besides, in the quick determination process, since the presence or absence of degradation of the three-way catalyst is determined by taking into account not only the post-correction oxygen storage amount A but also the average value B, the decline in the accuracy of the determination as to the presence or absence of degradation of the three-way catalyst which is caused by the determination based on only the post-correction oxygen storage amount A is restrained.

A third effect will be described. In the quick determination process, if the post-correction oxygen storage amount A is less than the first threshold value S, it is immediately determined that degradation of the three-way catalyst is present, as can be understood from FIG. 8. It is to be noted herein that the situation in which the post-correction oxygen storage amount A is less than the first threshold value S means a situation in which it is doubtful that the three-way catalyst is normal. When the normality of the three-way catalyst is doubtful in this manner, it is determined that degradation of the three-way catalyst is present, as described above. Therefore, in situations in which it is doubtful that the three-way catalyst is normal, the embodiment reduces the incidence of a situation in which although the three-way catalyst has actually degraded, it is not determined that degradation of the three-way catalyst is present.

A fourth effect will be described. In the quick determination process, if the post-correction oxygen storage amount A is greater than or equal to the first threshold value S and the average value B is greater than or equal to the second threshold value T, it is determined, on the basis of this condition, that the degradation of the three-way catalyst is not present. It is to be noted herein that the condition that the post-correction oxygen storage amount A is greater than or equal to the first threshold value S and the average value B is greater than or equal to the second threshold value T means a situation in which it is very highly likely that the three-way catalyst is normal. When the possibility of the three-way catalyst being normal is high, it is determined that degradation of the three-way catalyst is not present. Therefore, when it is determined that degradation of the three-way catalyst is not present, the determination can be provided as an accurate one.

A fifth effect will be described. In the quick determination process, if the post-correction oxygen storage amount A is greater than or equal to the first threshold value S and the average value B is less than the second threshold value T, the determination as to the presence or absence of degradation of the three-way catalyst is suspended. It is to be noted herein that the situation in which the post-correction oxygen storage amount A is greater than or equal to the first threshold value S and the average value B is less than the second threshold value T means a situation in which it is difficult to determine whether the three-way catalyst has degraded, or has not degraded but is normal. When it is difficult to determine whether the three-way catalyst has degraded, or has not degraded but is normal, the determination as to the presence or absence of degradation of the three-way catalyst is suspended as stated above. Therefore, the embodiment is able to avoid an error in the determination as to the presence or absence of degradation of the three-way catalyst which can be caused when the determination is performed easily without careful consideration.

Incidentally, the foregoing embodiments can be changed, for example, as follows. As for the quick determination process, the determination as to the presence or absence of degradation of the three-way catalyst may be performed so that results of the determination based on the comparison of the post-correction oxygen storage amount A with the first threshold value S and the comparison of the average value B with the second threshold value T are as shown tables in FIGS. 9A to 9F.

Besides, it is also permissible to perform only one of the ordinary determination process and the quick determination process. Besides, the oxygen sensor 18, as a post-catalyst sensor, may be substituted with an air/fuel ratio sensor. Besides, the air/fuel ratio sensor 17, as a pre-catalyst sensor, may be substituted with an oxygen sensor.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A catalyst degradation detection apparatus comprising:
a pre-catalyst sensor that is provided in an exhaust passageway of an internal combustion engine upstream of a catalyst and that outputs a signal based on an oxygen concentration in exhaust gas;
a post-catalyst sensor that is provided in the exhaust passageway downstream of the catalyst and that outputs a signal based on the oxygen concentration in the exhaust gas; and
an electronic control unit having control logic configured to cause the electronic control unit to:
control an air/fuel ratio of the internal combustion engine such that the air/fuel ratio changes between a rich side and a lean side;
provide a criterion value for determining that a change that corresponds to a change in the air/fuel ratio has occurred in the signal of the post-catalyst sensor;
calculate as an oxygen storage amount of the catalyst an amount of oxygen stored into the catalyst or desorbed from the catalyst during a period from when the change that corresponds to the change in the air/fuel ratio occurs in the signal of the pre-catalyst sensor to when the signal of the post-catalyst sensor reaches the criterion value;
calculate the amount of oxygen that is stored into the catalyst when the air/fuel ratio of the internal combustion engine is changed from the rich side to the lean side by the electronic control unit, as the oxygen storage amount found when oxygen is stored;
calculate the amount of oxygen that is desorbed from the catalyst when the air/fuel ratio of the internal combustion engine is changed from the lean side to the rich side by the electronic control unit, as the oxygen storage amount found when oxygen is desorbed:
determine presence or absence of degradation of the catalyst based on the oxygen storage amount;
measure responsiveness of a change in the signal output by the post-catalyst sensor to a change in the oxygen concentration in the exhaust gas downstream of the catalyst;
measure the responsiveness of the signal output by the post-catalyst sensor to the change in the air/fuel ratio to the lean side when the air/fuel ratio of the internal combustion engine is changed from the rich side to the lean side by the electronic control unit;
measure the responsiveness of the signal output by the post-catalyst sensor to the change in the air/fuel ratio to the rich side when the air/fuel ratio of the internal combustion engine is changed from the lean side to the rich side by the electronic control unit;

correct the oxygen storage amount calculated for use for determining the presence or absence of degradation of the catalyst by determining a corrected oxygen storage amount by reducing the calculated oxygen storage amount more greatly as the responsiveness of the post-catalyst sensor measured by the electronic control unit becomes more deteriorated relative to a reference value;

correct the oxygen storage amount found when oxygen is stored, based on the responsiveness of the post-catalyst sensor to the change in the air/fuel ratio to the lean side; and correct the oxygen storage amount found when oxygen is desorbed, based on the responsiveness of the post-catalyst sensor to the change in the air/fuel ratio to the rich side; wherein when only one of the responsiveness of the post-catalyst sensor to the change in the air/fuel ratio to the lean side and the responsiveness of the post-catalyst sensor to the change in the air/fuel ratio to the rich side has been measured, the electronic control unit calculates an average value of the oxygen storage amount corrected based on the only one of the responsiveness that has been measured and the oxygen storage amount that corresponds to the responsiveness that has not been measured, and determines the presence or absence of degradation of the catalyst based on comparison of the corrected oxygen storage amount with a predetermined first threshold value and comparison of the average value with a second threshold value that is greater than the first threshold value.

2. The catalyst degradation detection apparatus according to claim 1, wherein a value of the responsiveness obtained when the responsiveness of the post-catalyst sensor is not deteriorated is set as the reference value.

3. The catalyst degradation detection apparatus according to claim 1, wherein the electronic control unit determines that the catalyst has degraded, if the corrected oxygen storage amount is less than the first threshold value.

4. The catalyst degradation detection apparatus according to claim 3, wherein the electronic control unit determines that the catalyst has not degraded, if the corrected oxygen storage amount is greater than or equal to the first threshold value and the average value is greater than or equal to the second threshold value.

5. The catalyst degradation detection apparatus according to claim 4, wherein the electronic control unit suspends determination as to the presence or absence of degradation of the catalyst, if the corrected oxygen storage amount is greater than or equal to the first threshold value and the average value is less than the second threshold value.

6. The catalyst degradation detection apparatus according to claim 1, wherein when both the responsiveness of the post-catalyst sensor to the change in the air/fuel ratio to the lean side and the responsiveness of the post-catalyst sensor to the change in the air/fuel ratio to the rich side have been measured, the electronic control unit compares the oxygen storage amount corrected based on the responsiveness to the change to the lean side with a predetermined third threshold value and compares the oxygen storage amount corrected based on the responsiveness to the change to the rich side with the predetermined third threshold value, and determines that the catalyst has degraded, if at least one of the corrected oxygen storage amounts is less than the third threshold value, and determines that the catalyst has not degraded, if both the corrected oxygen storage amounts are greater than or equal to the third threshold value.

* * * * *